United States Patent
MacNee, III et al.

(10) Patent No.: US 7,314,246 B2
(45) Date of Patent: Jan. 1, 2008

(54) MULTI-PANEL SUNROOF SYSTEM

(75) Inventors: Arthur L. MacNee, III, Southgate, MI (US); Christopher J. Dilluvio, Farmington Hills, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 96 days.

(21) Appl. No.: 11/316,382

(22) Filed: Dec. 22, 2005

(65) Prior Publication Data

US 2007/0145786 A1 Jun. 28, 2007

(51) Int. Cl.
B60J 7/047 (2006.01)
(52) U.S. Cl. .................................. 296/220.01
(58) Field of Classification Search ........... 296/220.01; 29/220.01
See application file for complete search history.

(56) References Cited

U.S. PATENT DOCUMENTS

| | | | |
|---|---|---|---|
| 2,348,579 A * | 5/1944 | Solis ........................ 296/215 |
| 4,185,868 A | 1/1980 | Kaltz et al. |
| 4,707,022 A * | 11/1987 | Roos et al. ................. 296/222 |
| 4,746,165 A | 5/1988 | Fuerst et al. |
| 4,893,869 A | 1/1990 | Fuerst |
| 4,911,496 A | 3/1990 | Fuerst |
| 4,923,246 A | 5/1990 | Takahashi et al. |
| 4,995,665 A | 2/1991 | Ichinose et al. |
| 5,018,783 A | 5/1991 | Chamings et al. |
| 5,029,937 A | 7/1991 | Yamamoto |
| 5,154,482 A | 10/1992 | Hayashi et al. |
| 5,197,779 A | 3/1993 | Mizuno et al. |
| 5,447,355 A * | 9/1995 | Kelm ........................ 296/223 |
| 5,516,187 A | 5/1996 | Zani et al. |
| 5,746,475 A | 5/1998 | Caye et al. |
| 5,836,644 A * | 11/1998 | Smith ........................ 296/219 |
| 5,941,598 A | 8/1999 | Cave et al. |
| 5,951,100 A | 9/1999 | Ewing et al. |
| 6,460,921 B2 * | 10/2002 | DeGaillard ................. 296/218 |
| 2002/0125743 A1 * | 9/2002 | Bohm et al. ........... 296/216.04 |
| 2004/0021344 A1 * | 2/2004 | Beierl .................... 296/220.01 |

FOREIGN PATENT DOCUMENTS

| | | | |
|---|---|---|---|
| DE | 19 46 161 B2 | 1/1978 | |
| DE | 31 49 977 A1 | 6/1983 | |
| EP | 1132238 | * 12/2001 | ............ 296/220.01 |
| GB | 573355 | * 11/1945 | ............ 296/220.01 |
| GB | 2 295 801 A | 6/1996 | |
| WO | WO 94/25301 | 11/1994 | |

OTHER PUBLICATIONS

Drawing—ASC Housing Assembly—Complete (750) (offered for sale prior to 2004).
http://www.bmwusa.com page entitled "Panoramic Roof" dated Dec. 15, 2005.
http://www.porsche.co.za page entitled Panoramic Roof System dated Dec. 15, 2005.

* cited by examiner

*Primary Examiner*—Dennis H. Pedder
(74) *Attorney, Agent, or Firm*—Harness, Dickey & Pierce, P.L.C.

(57) ABSTRACT

A multi-panel sunroof employs at least three movable sunroof panels. In another aspect of the present invention, three sunroof panels are stacked upon each other in one or two different operating positions. A further aspect of the present invention provides for rearward opening movement of a front sunroof panel and forward opening movement of a rear sunroof panel.

24 Claims, 25 Drawing Sheets

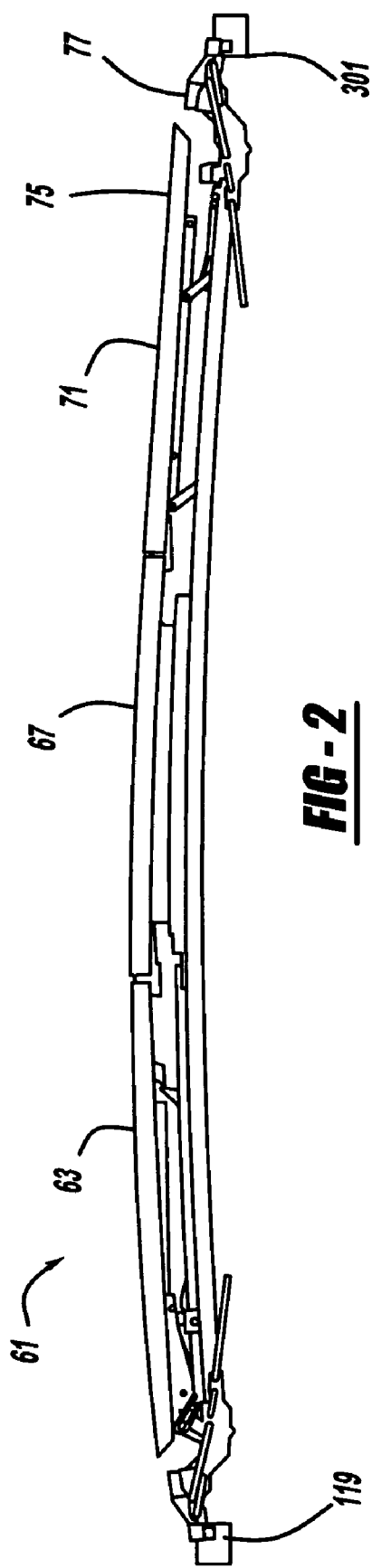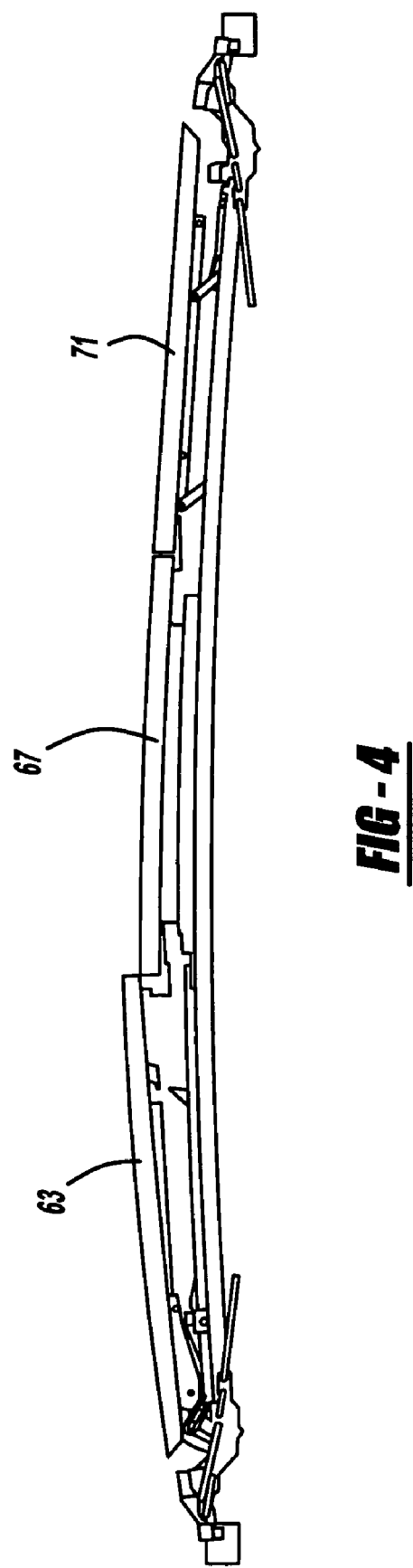

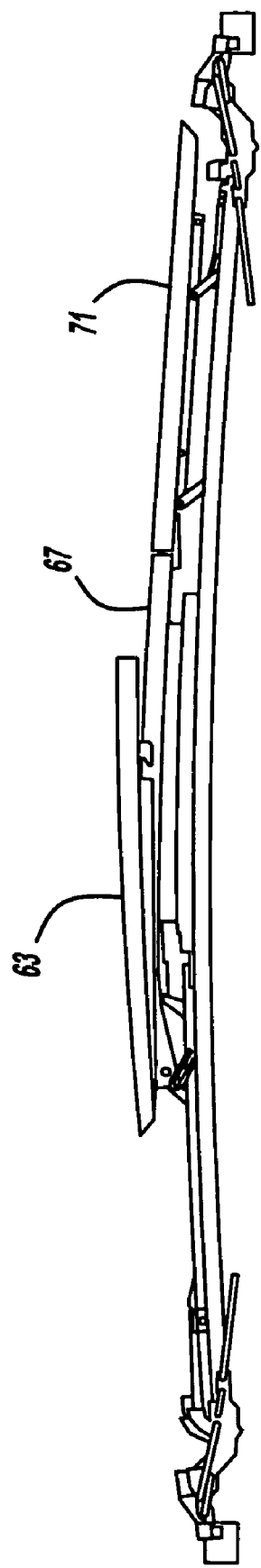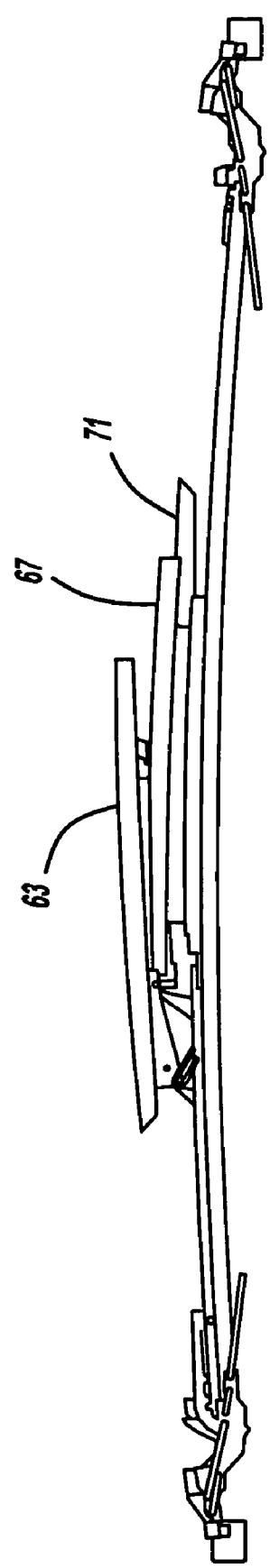

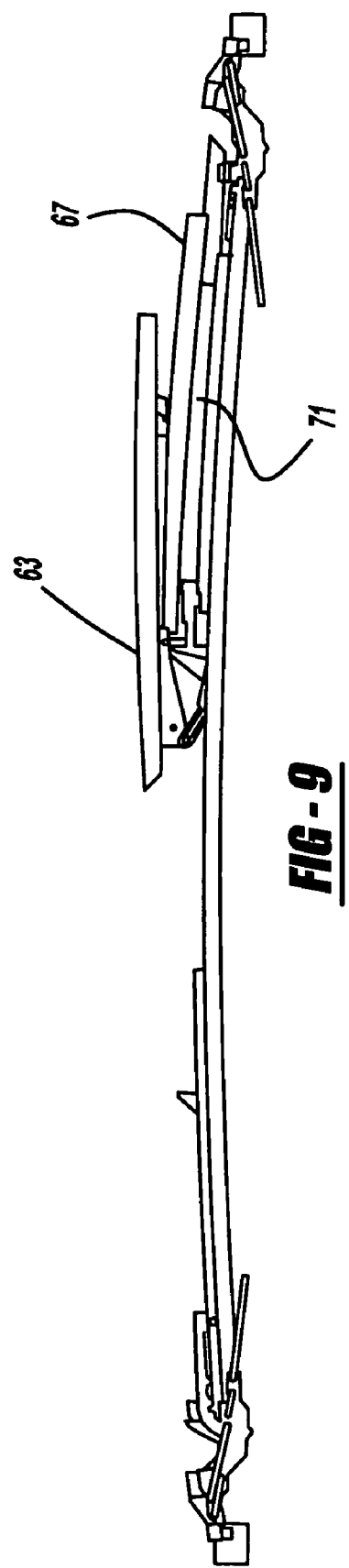
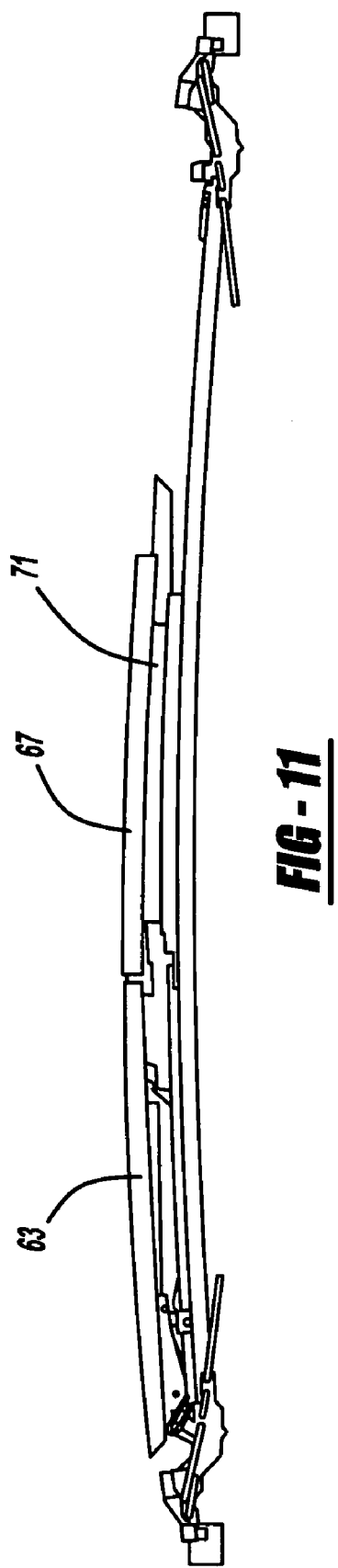
FIG-9
FIG-11

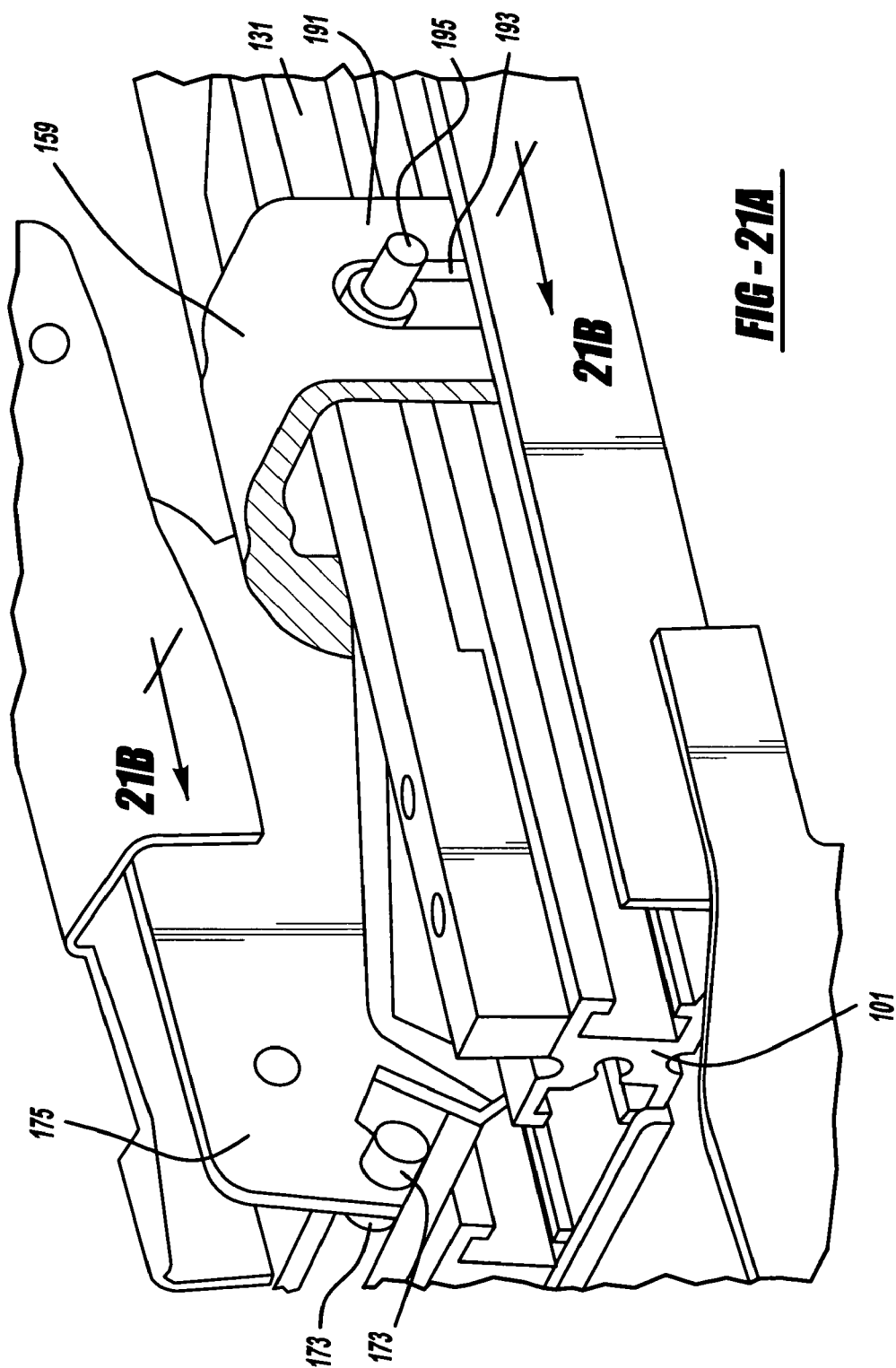

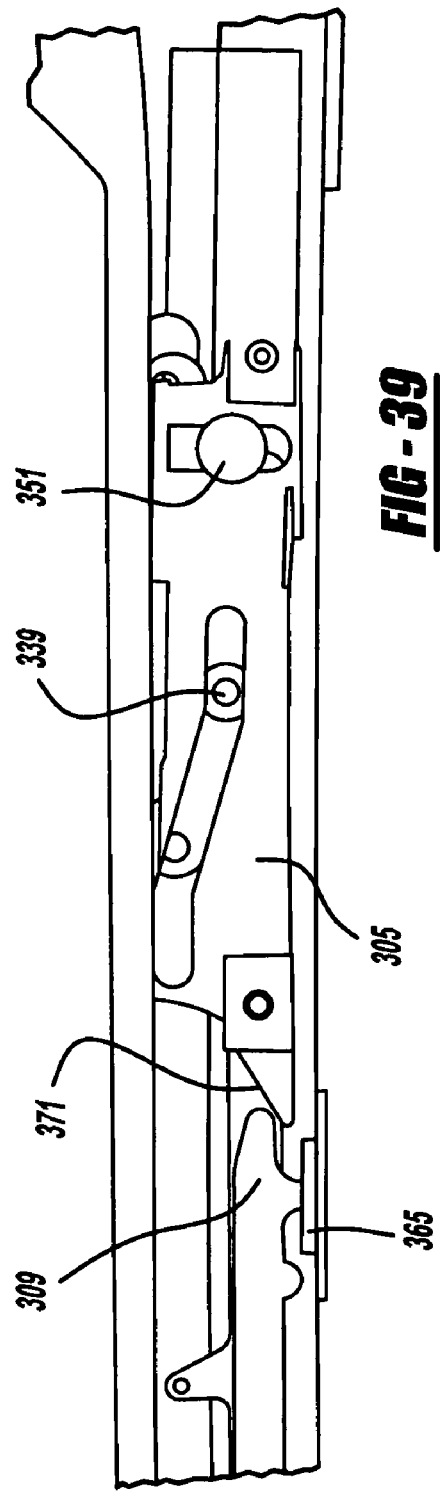
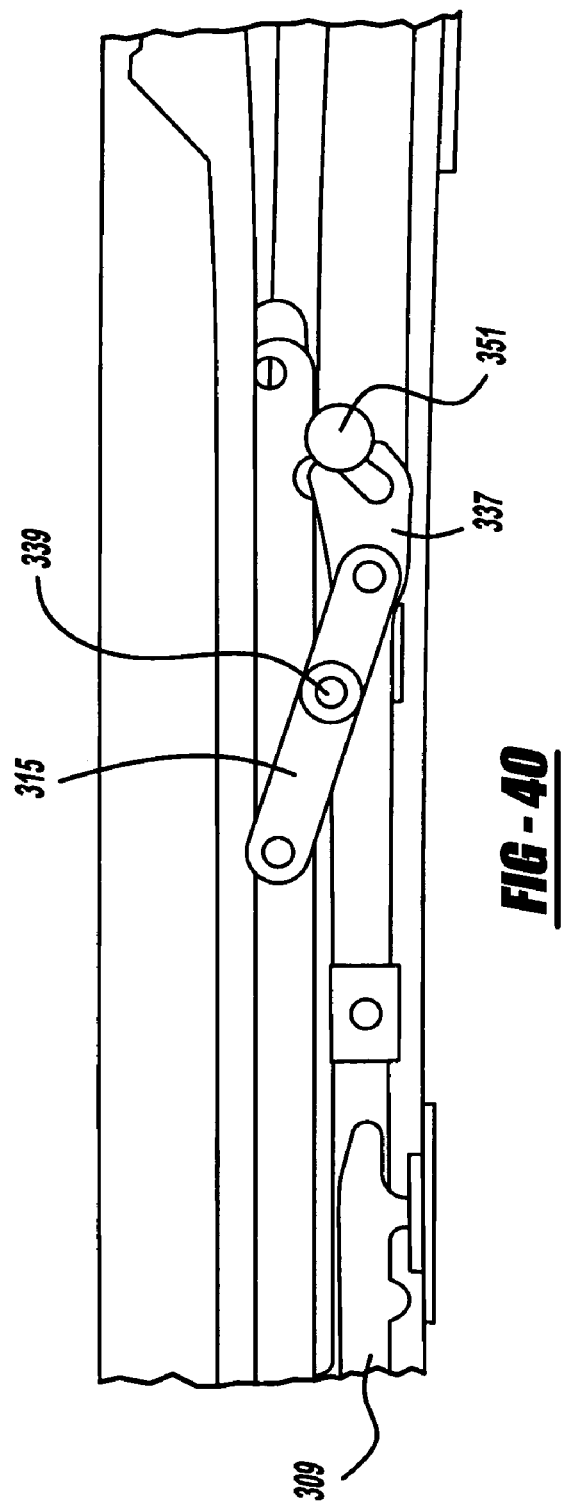

MULTI-PANEL SUNROOF SYSTEM

BACKGROUND OF THE INVENTION

The present invention relates generally to automotive vehicle sunroofs and more particularly to a multi-panel sunroof system.

It is common to employ single-panel sunroofs in automotive vehicles. More recently, various attempts have been made to increase the sunroof opening area in vehicles to maximize open roof area above all of the vehicle passengers especially as the front windshield header continues to move rearwardly for styling and aerodynamic reasons. For example, various multi-panel sunroofs have been considered to increase open roof area and are disclosed in the following U.S. Pat. No. 5,746,475 entitled "Drive Mechanism for an Automotive Vehicle Sunroof Assembly" which issued to Caye et al. on May 5, 1998; U.S. Pat. No. 5,197,779 entitled "Power Sliding Sunroof" which issued to Mizuno et al. on Mar. 30, 1993; and U.S. Pat. No. 5,029,937 entitled "Roof System for Vehicle" which issued to Yamamoto on Jul. 9, 1991; all of which are incorporated by reference herein. While some of these patents offer significant improvements, the sunroof tracks take up considerable vertical space thereby encroaching on desired headroom of the vehicle occupants, and do not provide vertical access above the storage area of a sport utility vehicle or station wagon.

SUMMARY OF THE INVENTION

In accordance with the present invention, a multi-panel sunroof employs at least three movable sunroof panels. In another aspect of the present invention, three sunroof panels are stacked upon each other in one or two different operating positions. A further aspect of the present invention provides for rearward opening movement of a front sunroof panel and forward opening movement of a rear sunroof panel. Yet another aspect of the present invention provides for a unique locking member and hook structure of a sunroof movement mechanism. An additional aspect of the present invention sunroof system includes a sunroof slide block having a body, a diagonally extending camming surface, an opening therebetween, and a trailing ramp. A method of operating a sunroof system is also provided.

The multi-panel sunroof system of the present invention is advantageous over traditional constructions in that the present invention system employs a track having reduced vertical depth in order to maximize occupant head room within the vehicle. The present invention is further advantageous by maximizing opening area above the front and rear seat passengers while also allowing vertical opening access over the storage area of the vehicle, such that cargo can be stored therein and extend above the nominal roof plane. Furthermore, various embodiments of the present invention employ in-line, multi-panel tracks along each side rail of the vehicle which allows for the multiple sunroof panels to be substantially co-planar when closed (while being slightly curved to account for the normal vehicle styling curvature). The single common track on each vehicular side also reduces tooling and assembly costs, while reducing parts in an assembly plant. Additional advantages and features of the present invention will become apparent from the following description and appended claims, taken in conjunction with the accompanying drawings.

BRIEF DESCRIPTION OF THE DRAWINGS

FIG. 2 is a diagrammatic side view showing the sunroof system, with all of the panels closed;

FIG. 4 is a diagrammatic side view showing the sunroof system, with the front panel vented, and the central and rear panels closed;

FIG. 6 is a diagrammatic side view showing the sunroof system, with the front panel in its intermediate open position and the central and rear panels closed;

FIG. 7B is a diagrammatic side view showing the sunroof system, with the front panel in its intermediate open position, the central panel in its closed position, and the rear panel in its open position;

FIG. 9 is a diagrammatic side view showing the sunroof system, with the front panel in its extended open position, the central panel in its open position, and the rear panel in its closed position;

FIG. 11 is a diagrammatic side view showing the sunroof system, with the front and central panels in their closed positions and the rear panel in its open position;

FIG. 21A is a fragmentary perspective view showing the front movement mechanism of the sunroof system;

FIGS. 30-40 are a series of side diagrammatic views showing movement orientations of the movement mechanisms of the sunroof system.

DETAILED DESCRIPTION OF THE PREFERRED EMBODIMENT

Figure 1:
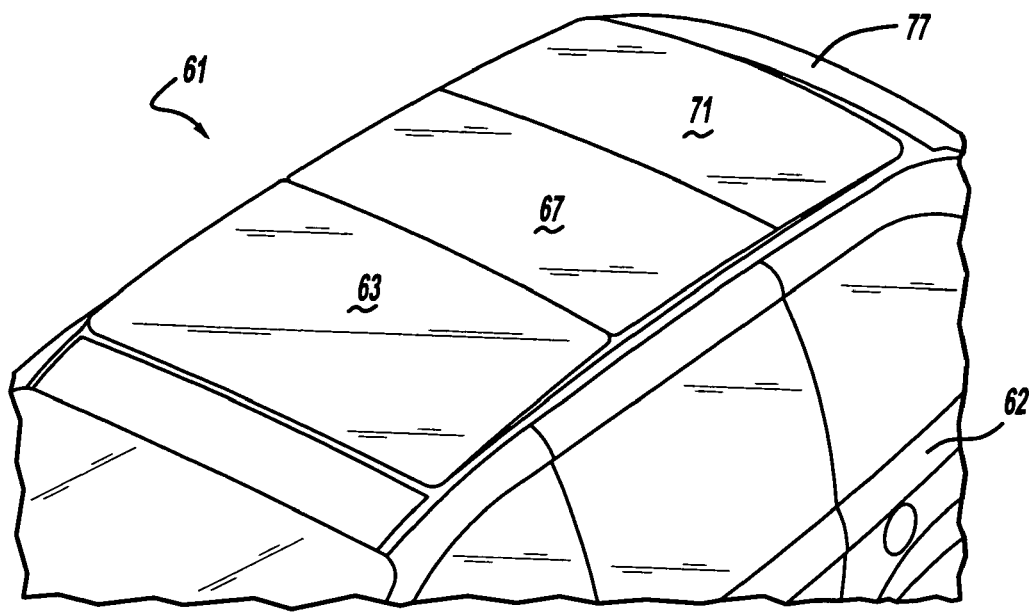
FIG. 1 is a perspective view, taken from a vehicular front left corner, showing the preferred embodiment of the present invention multi-panel sunroof system, with all of the sunroof panels closed.

The preferred embodiment of a multi-panel sunroof system 61 of the present invention is employed in an automotive vehicle 62 as is shown in FIGS. 1 and 2. Multi-panel sunroof system 61 includes a front sunroof panel 63 coupled to a front movement mechanism 65, a central sunroof panel 67 coupled to a central movement mechanism 69, and a rear sunroof panel 71 coupled to a rear movement mechanism 73. The sunroof panels are each made from three dimensionally curved, generally transparent and rigid glass sheets. The sunroof panels have exterior surfaces 75 generally flush with each other and with the adjacent stationary roof panels 77 at a front header, rear header, and side rails or door uppers, along a somewhat horizontally curved plane. A contiguous roof opening 79 is defined by a sunroof periphery 81 in stationary roof panels 77, or a tub frame mounted thereto, as can be observed in FIGS. 7 and 8.

Figure 3:
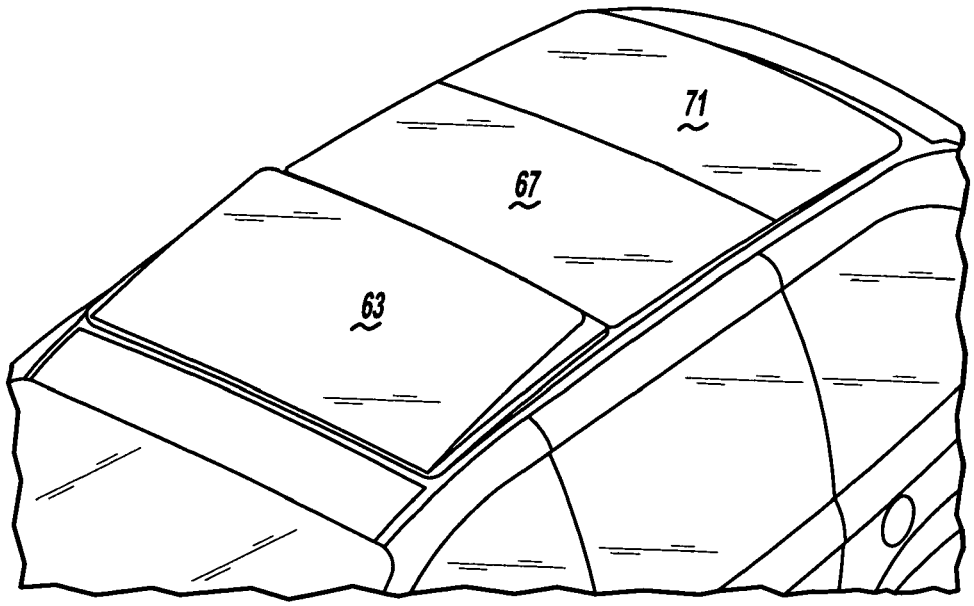
FIG. 3 is a perspective view showing the sunroof system, with the front panel vented, and the central and rear panels closed.
Figure 5:
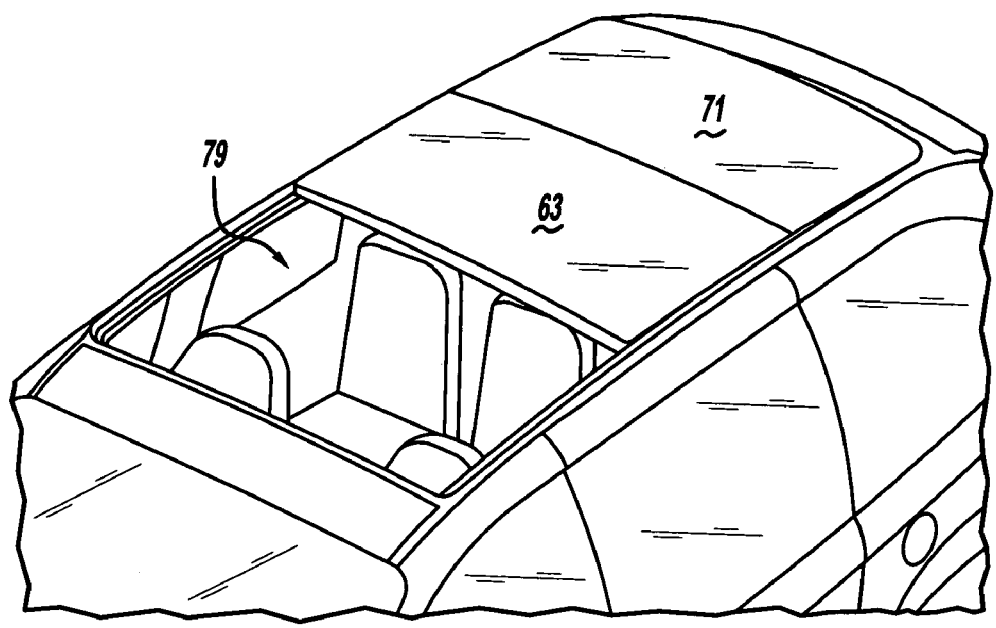
FIG. 5 is a perspective view showing the sunroof system, with the front panel in an intermediate open position and the central and rear panels closed.
Figure 8:
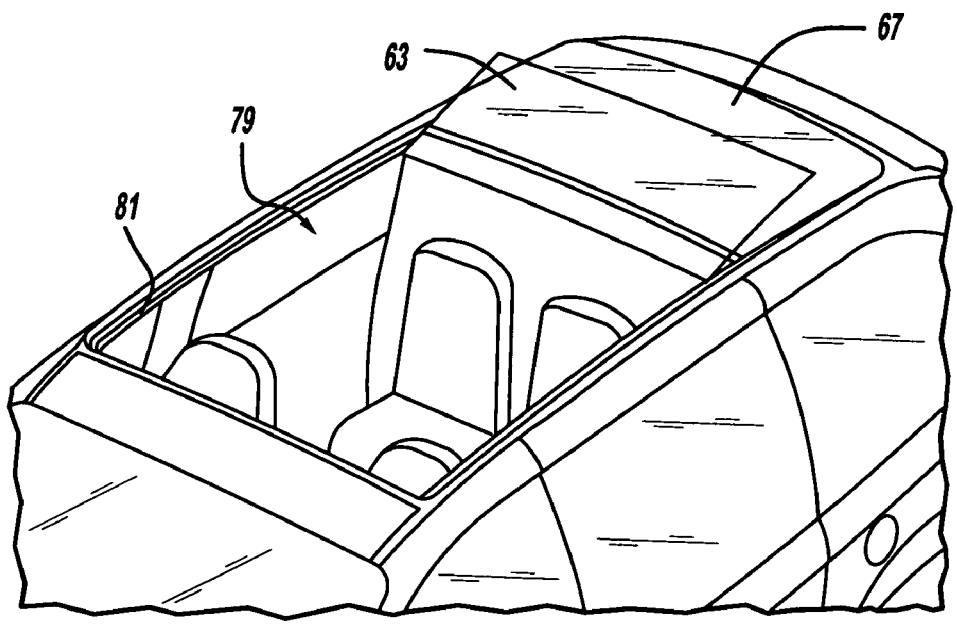
FIG. 8 is a perspective view showing the sunroof system, with the front panel in its extended open position, the central panel in its open position, and the rear panel in its closed position.
Figure 7A:
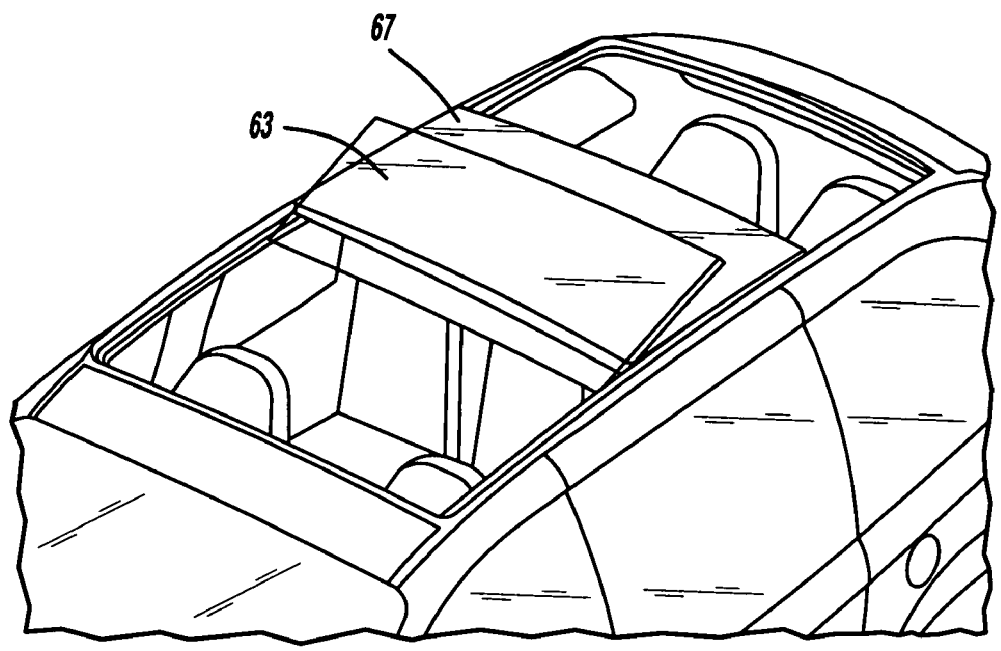
FIG. 7A is a perspective view showing the sunroof system, with the front panel in its intermediate open position, the central panel in its closed position, and the rear panel in its open position.
Figure 10:
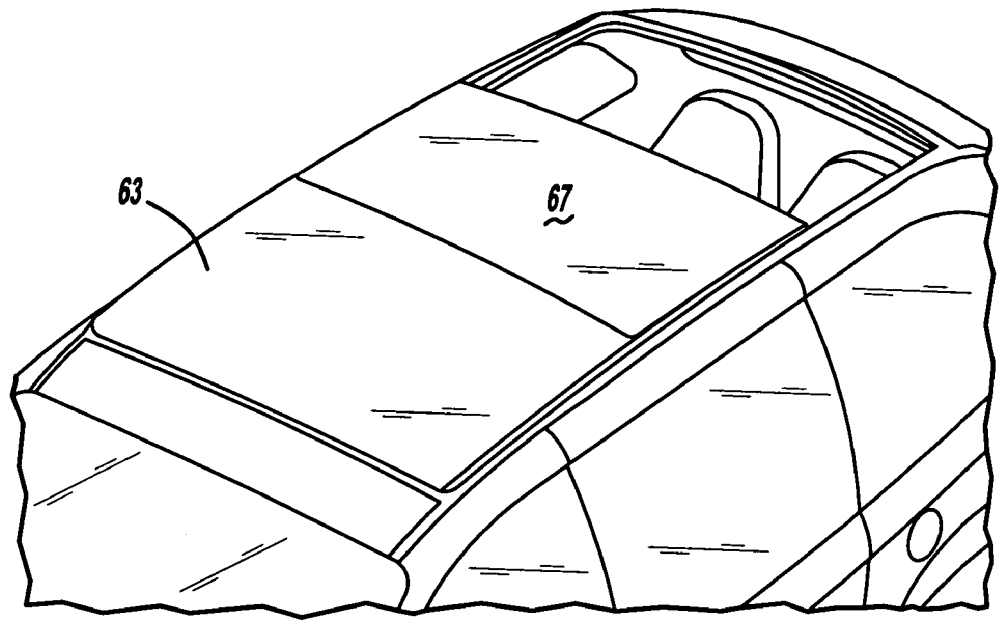
FIG. 10 is a perspective view showing the sunroof system, with the front and central panels in their closed positions and the rear panel in its open position.
Figure 12:
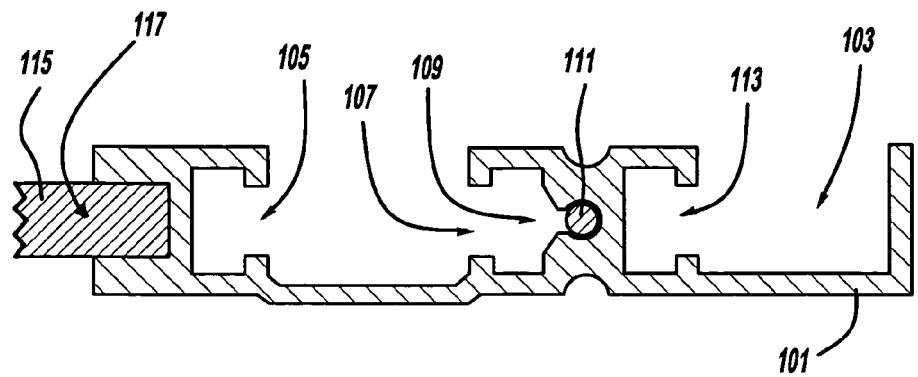
FIG. 12 is a cross sectional view, taken along line 12-12 of FIG. 13, showing a track employed in the sunroof system.
Figure 13:
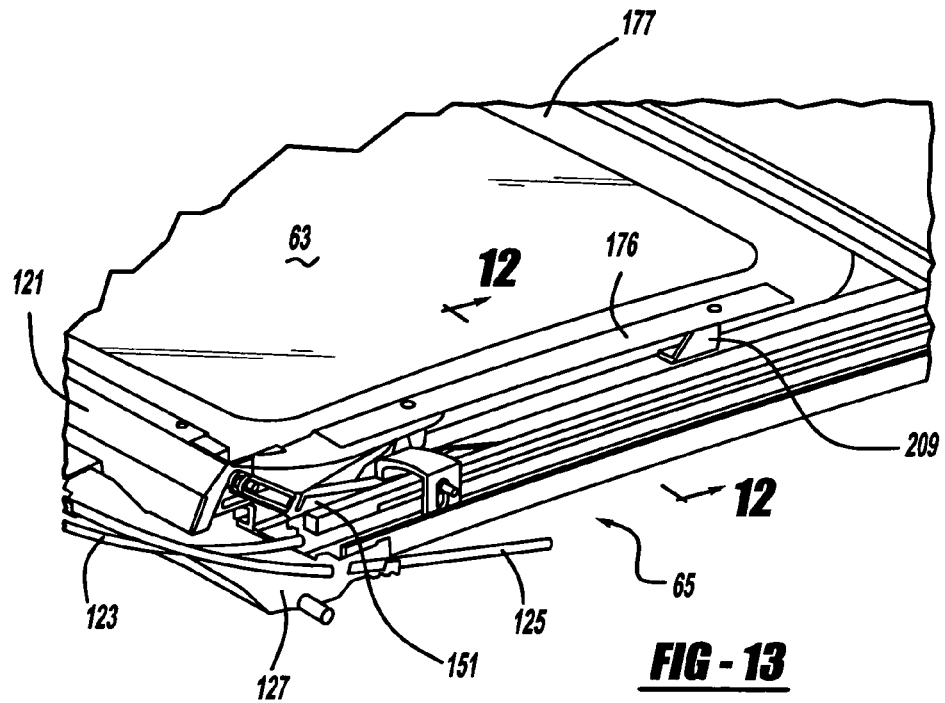
FIG. 13 is a perspective view, taken from a vehicular front left corner, showing a portion of the sunroof system, with a left-hand front movement mechanism in a closed position.
Figure 14:
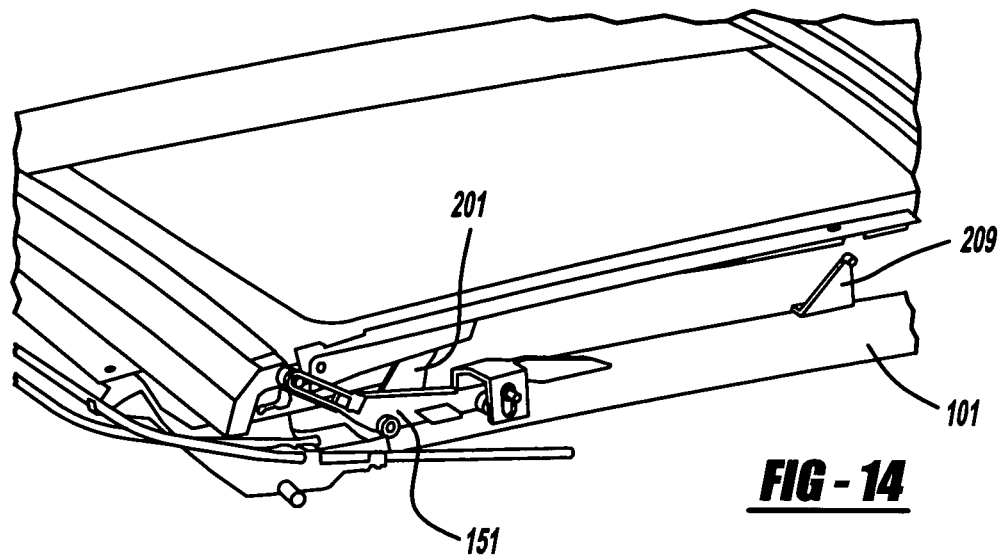
FIG. 14 is a perspective view showing a portion of the sunroof system, with the front movement mechanism in a vented position.
Figure 15:
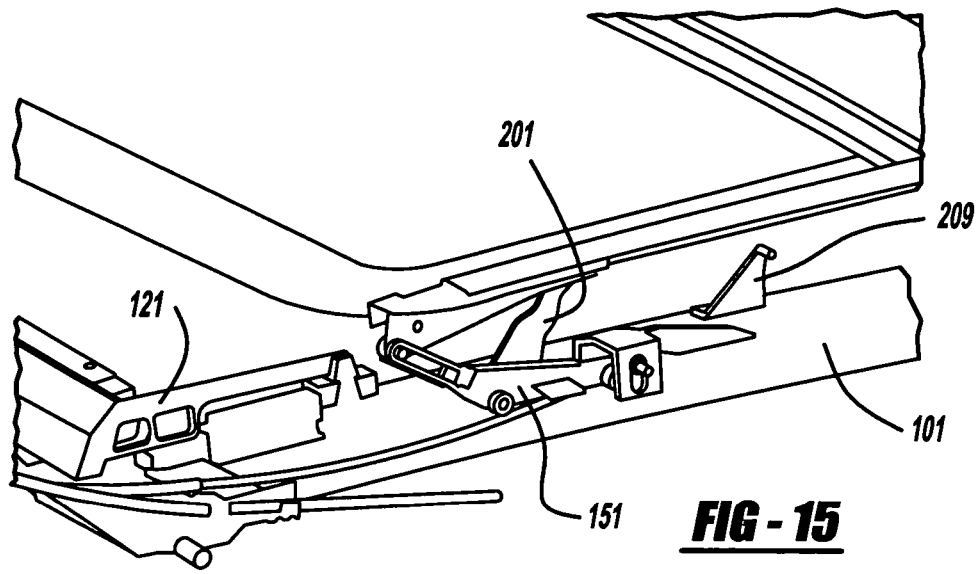
FIG. 15 is a perspective view showing a portion of the sunroof system, with the front movement mechanism moved to a partly open position.
Figure 16:
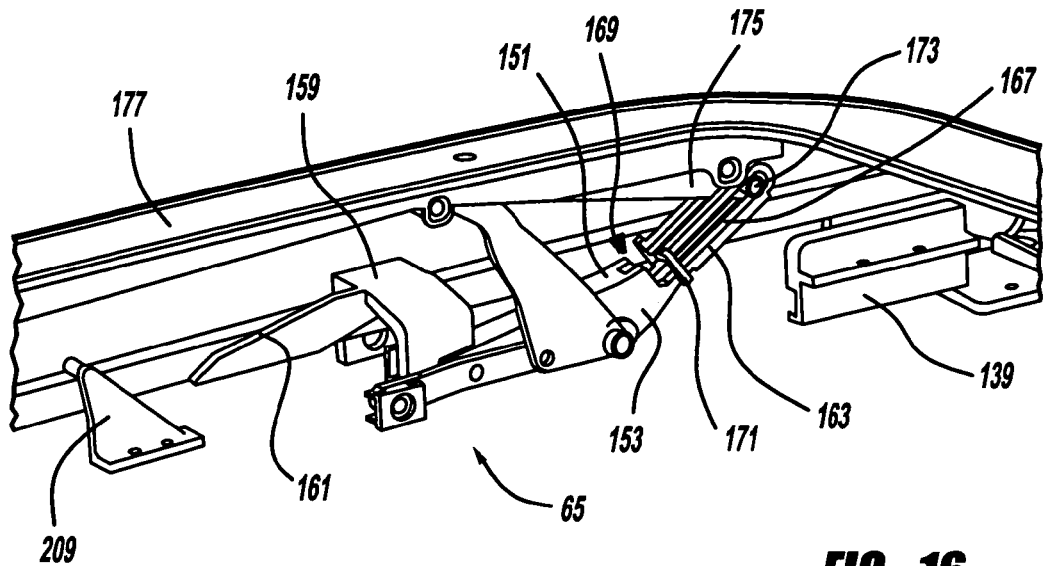
FIG. 16 is a perspective view, taken from a rear right vehicular corner, showing the front movement mechanism of the sunroof system.
Figure 17:
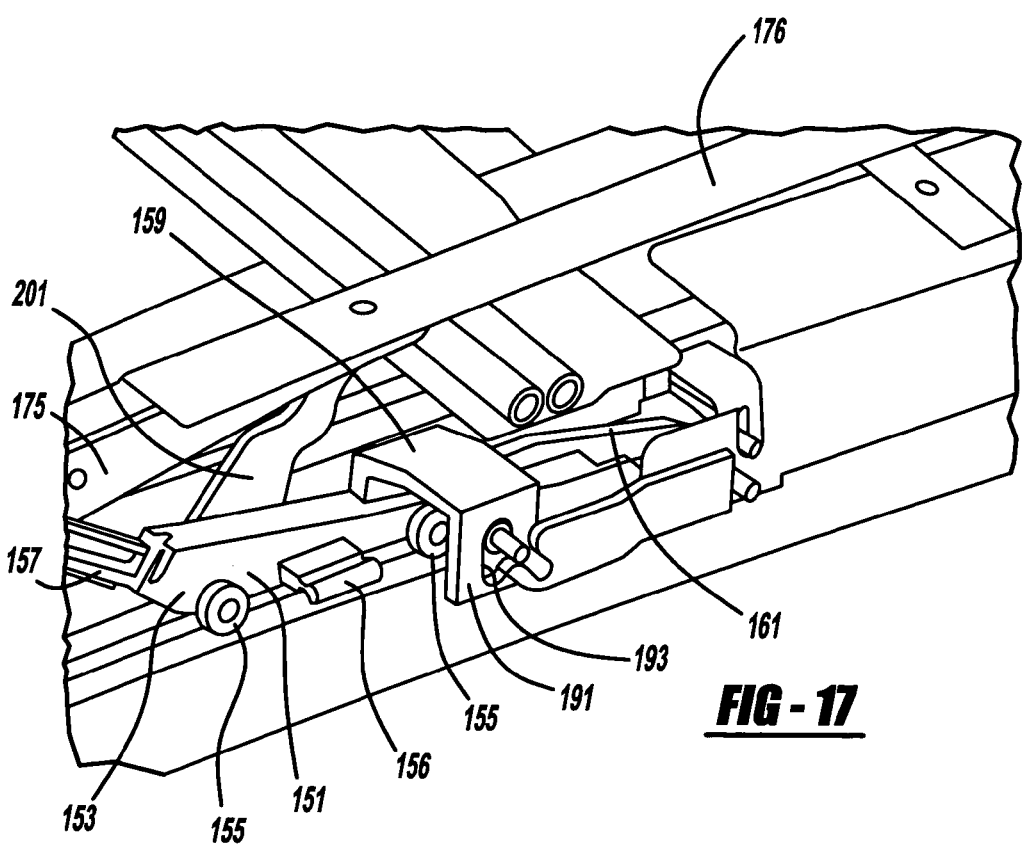
FIG. 17 is a perspective view showing a portion of the sunroof system, with the front movement mechanism opened just before engagement to a central movement mechanism.
Figure 18:
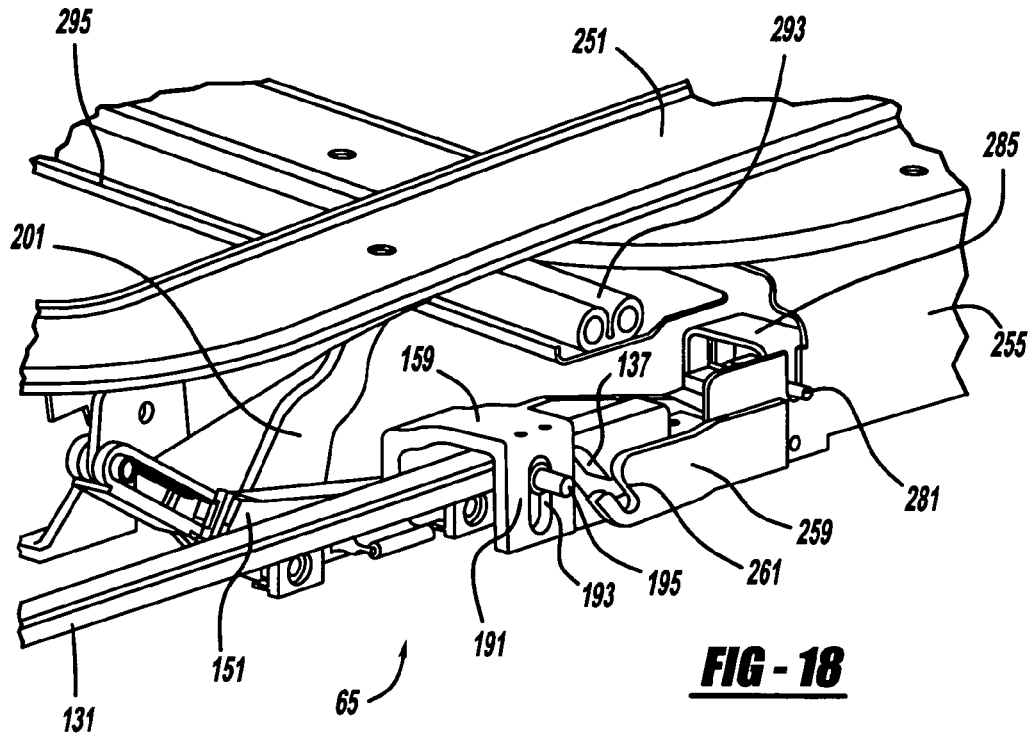
FIG. 18 is a perspective view showing a portion of the sunroof system, with the front movement mechanism opened just before engagement to the central movement mechanism.
Figure 19:
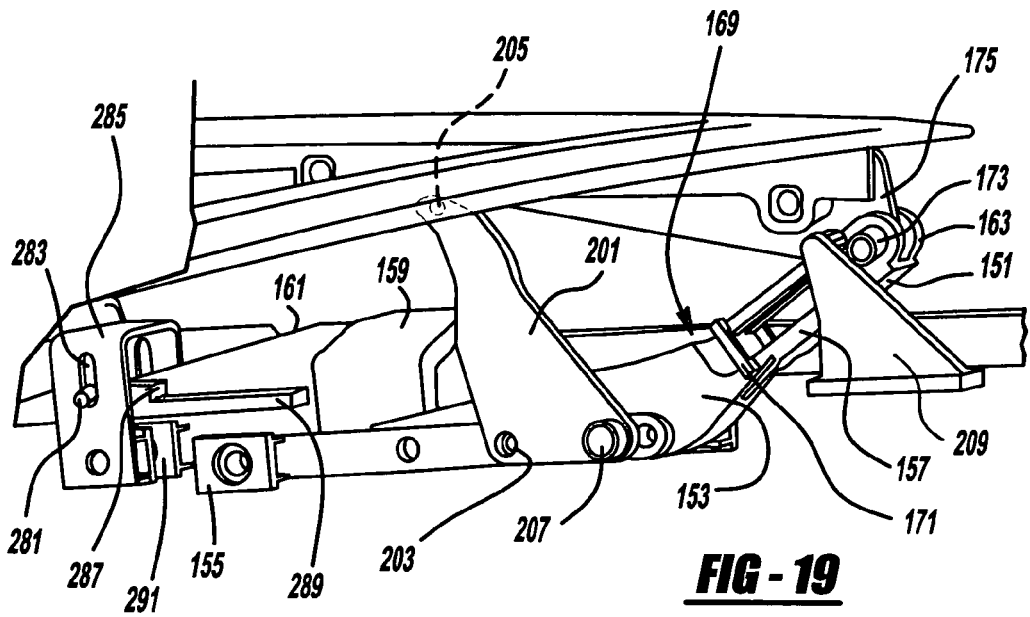
FIG. 19 is a perspective view, taken from a front right vehicular corner, showing a portion of the sunroof system, with the front movement mechanism engaged with the central movement mechanism.
Figure 20:
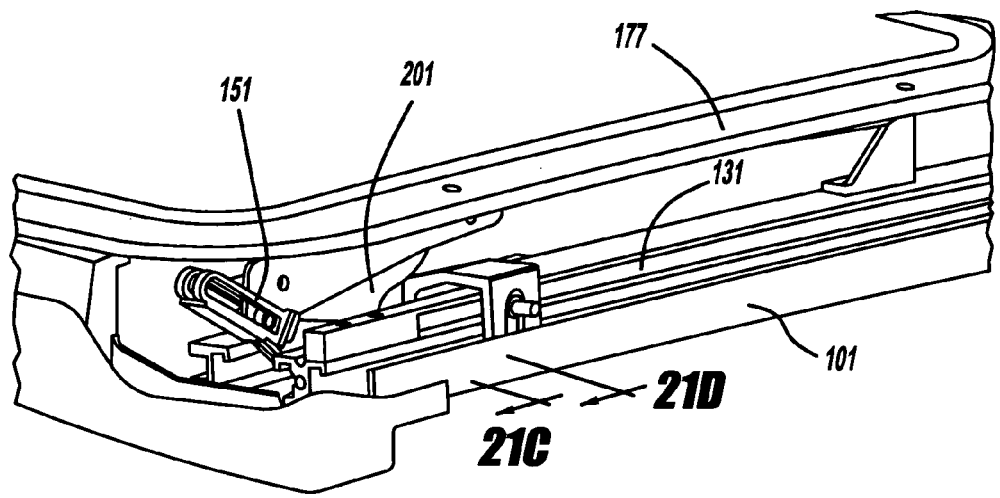
FIG. 20 is a perspective view showing the front movement mechanism of the sunroof system, disposed in its closed position.
Figure 25:
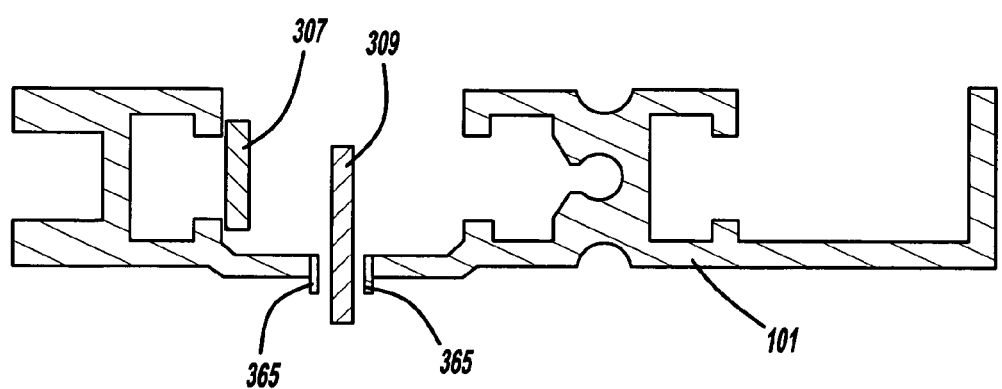
FIG. 25 is a cross sectional view, taken along line 25-25 of FIG. 27, showing the rear movement mechanism of the sunroof assembly, disposed in a locked orientation.
Figure 21B:
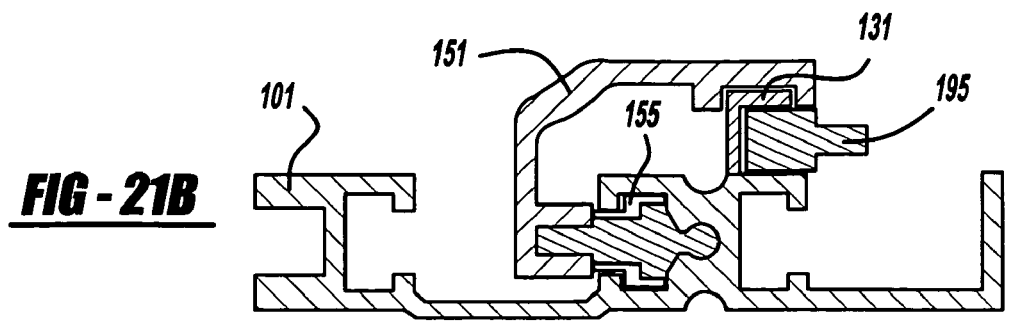
FIG. 21B is a cross sectional view, taken along line 21B-21B of FIG. 21 A, showing the front movement mechanism of the sunroof system.
Figure 21C:
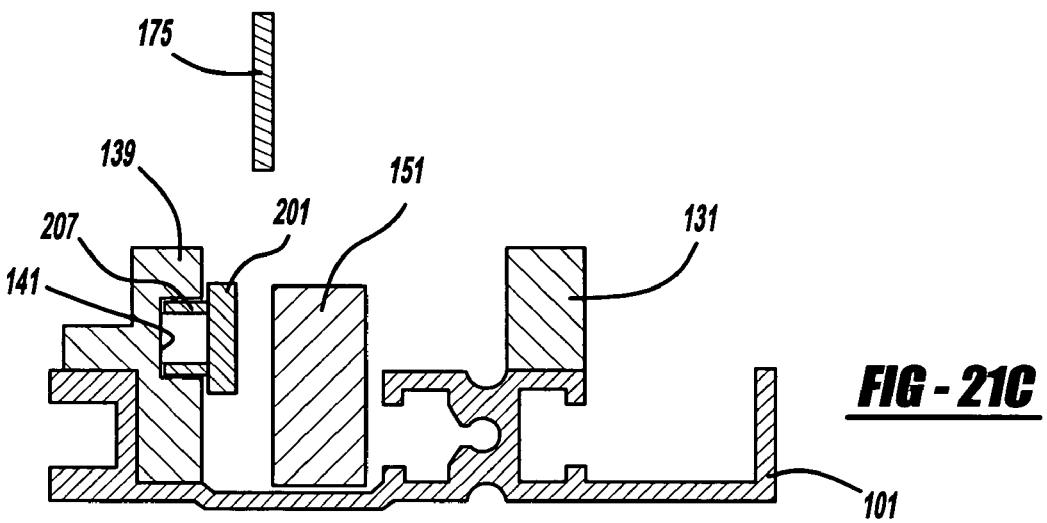
FIG. 21C is a cross sectional view, taken along line 21C-21C of FIG. 20, showing the front movement mechanism of the sunroof system.
Figure 21D:
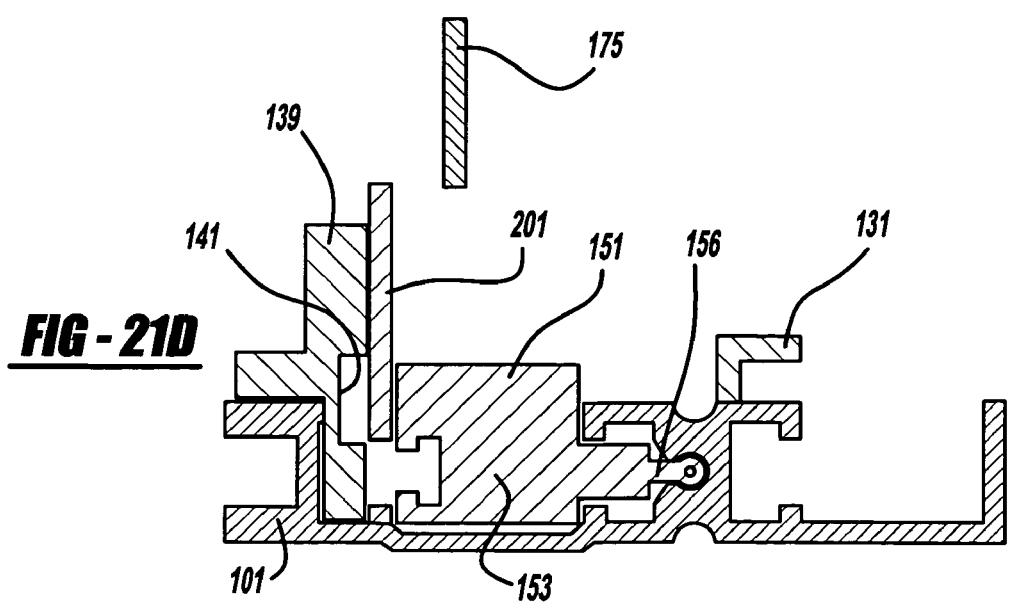
FIG. 21D is a cross sectional view, taken along line 21D-21D of FIG. 20, showing the front movement mechanism of the sunroof system.

FIGS. 1 and 2 show all sunroof panels 63, 67 and 71 in their closed positions. FIGS. 3 and 4 show front sunroof panel 63 in its upwardly tilted venting position, to allow some air flow through an open space adjacent a rear edge thereof, while central and rear sunroof panels 67 and 71, respectively, are in their closed positions. Furthermore, FIGS. 5 and 6 illustrate front sunroof panel 63 rearwardly moved to an intermediate open position, in a spoiler-type orientation stacked above the closed central sunroof panel 67, while rear sunroof panel 71 is in its closed position. FIGS. 7 and 7A show front and central sunroof panels 63 and 67, respectively, in the positions discussed with regard to FIG. 6, but rear sunroof panel 71 is forwardly moved to its open position dropped below central sunroof panel 67 in a three panel stacked configuration. Moreover, FIGS. 8 and 9 illustrate the same three panel stacked configuration but with front sunroof panel 63 moved to its extended open position, central sunroof panel 67, rearwardly moved to its open position, and rear sunroof panel 71 in its closed position. Finally, FIGS. 10 and 11 represent front and central sunroof panels 63 and 67, respectively, disposed in their closed positions with rear sunroof panel 71 moved to its open position to allow vertical cargo passage to a cargo area through a nominal roof plane or to allow open air space above a third passenger seating row. In at least some operating conditions, front and rear sunroof panels 63 and 71, respectively, are independently operably relative to each other, while central sunroof panel 67 is passively driven by movement of front sunroof panel 63.

Referring to FIGS. 12, 13, 21B, 21C, 21D, 24B, 25, 28B, 29B and 41, a single extruded track 101 is mounted to each side rail of the stationary vehicular roof and elongated in a predominantly fore-and-aft longitudinal direction. Thus, a single common track is used for all of the left-hand movement mechanisms, and another single common track is used for all of the essentially mirror image right-hand movement mechanisms. Each track 101 has a water drain trough 103, a first guide channel 105, a second guide channel 107, a drive cable channel 109 which moves a Bowden-type cable 111, and a third guide channel 113. Sunshades 115 are movable within a sunshade channel 117 below and generally parallel to one or more of three sunroof panels. An electric motor actuator 119 (see FIG. 2) is secured to a front of the tub frame below a wind deflector assembly 121 (see FIG. 13). Cable 111 is automatically pushed and pulled by actuator 119 within a cable sheath 123. A run-out sheath 125 is also attached to a front corner drain trough 127 (see FIG. 13).

A middle track insert 131 is attached to track 101 and has a camming slot 133 with a first longitudinally elongated section 135 and a second generally diagonally angled section 137 blending into second channel 107 of track 101. A front track insert 139 is also attached to track 101 and has a generally diagonal camming slot 141 downwardly and rearwardly declining, and blending into first channel 105 of track 101.

Front movement mechanism 65 can be observed in FIGS. 13-21. A front slide block 151 includes a body 153, roller or rectangular slide feet 155 laterally mounted on each side of the body, a cable retainer 156 projecting from a side of the body, a camming section 157 extending from a leading end of the body, a housing 159 mounted to a top of the body, and a downwardly and rearwardly declining ramp 161 extending from a trailing end of the body. Camming section 157 has a pair of parallel and generally vertically planar walls 163 connected at their bottoms by a plate 165. A diagonally elongated camming slot 167 upwardly and forwardly inclines from body 153. Walls 163 are spaced away from each other with a top-accessible gap therebetween to allow passage of a coupled bracket. A top opening 169 is located in each slot 167 adjacent body 153, with a bridge 171 spanning across the slot in a laterally offset manner, to allow insertion of a laterally projecting cam follower pin 173 which thereafter rides along slots 167. Pin 173 is attached to a primary front bracket 175 which is mounted to a secondary front bracket, that is in turn, attached to a frame 177 adhered to an interior surface of front sunroof panel 63.

Housing 159 has a generally inverted-U shape with a predominantly vertical planar wall 191. A generally vertically elongated and closed slot 193 is disposed in wall 191 of housing 159. A middle of a front panel lock pin 195 selectively rides up and down within slot 193 of housing 159, an inboard end of pin 195 rides fore-and-aft or diagonally within the camming slot of middle track insert 131 and an outboard end of pin 195 is selectively engagable with its central panel locking hook.

Figure 22:
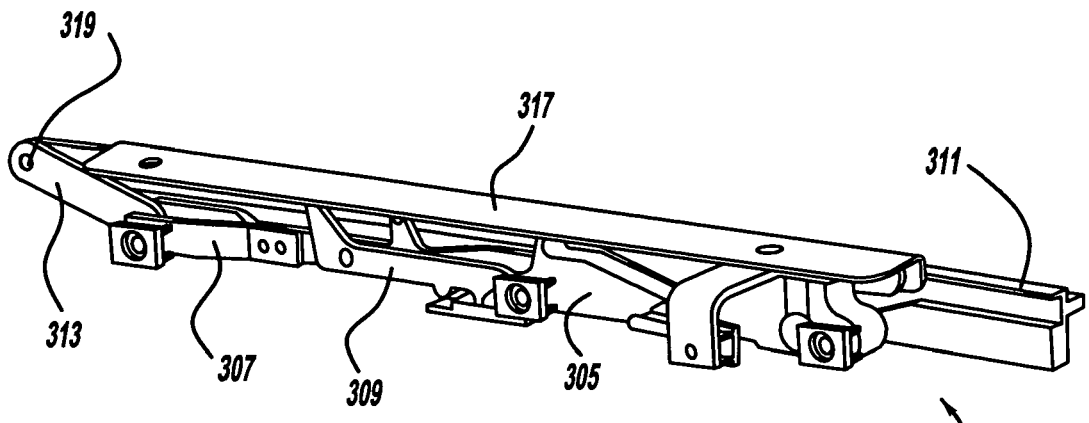
FIG. 22 is a perspective view, taken from a rear left vehicular corner, showing a left-hand rear movement mechanism of the sunroof system, in a collapsed and unlocked orientation.
Figure 23:
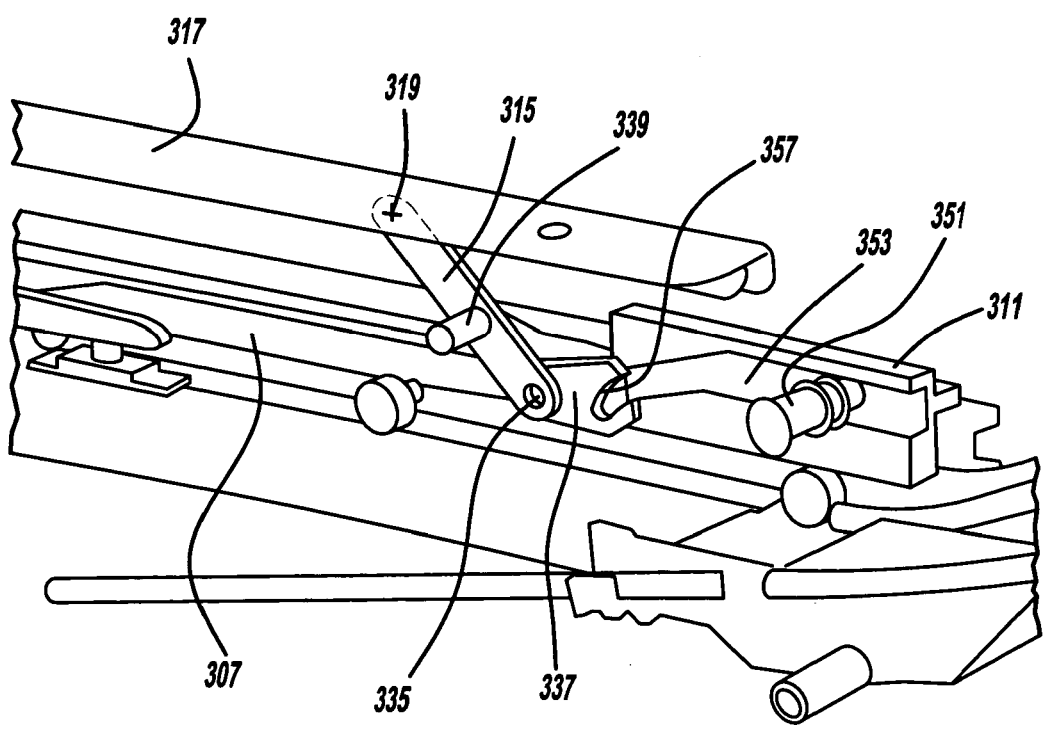
FIG. 23 is a perspective view, like that of FIG. 22, showing the rear movement mechanism in a raised orientation.
Figure 24A:
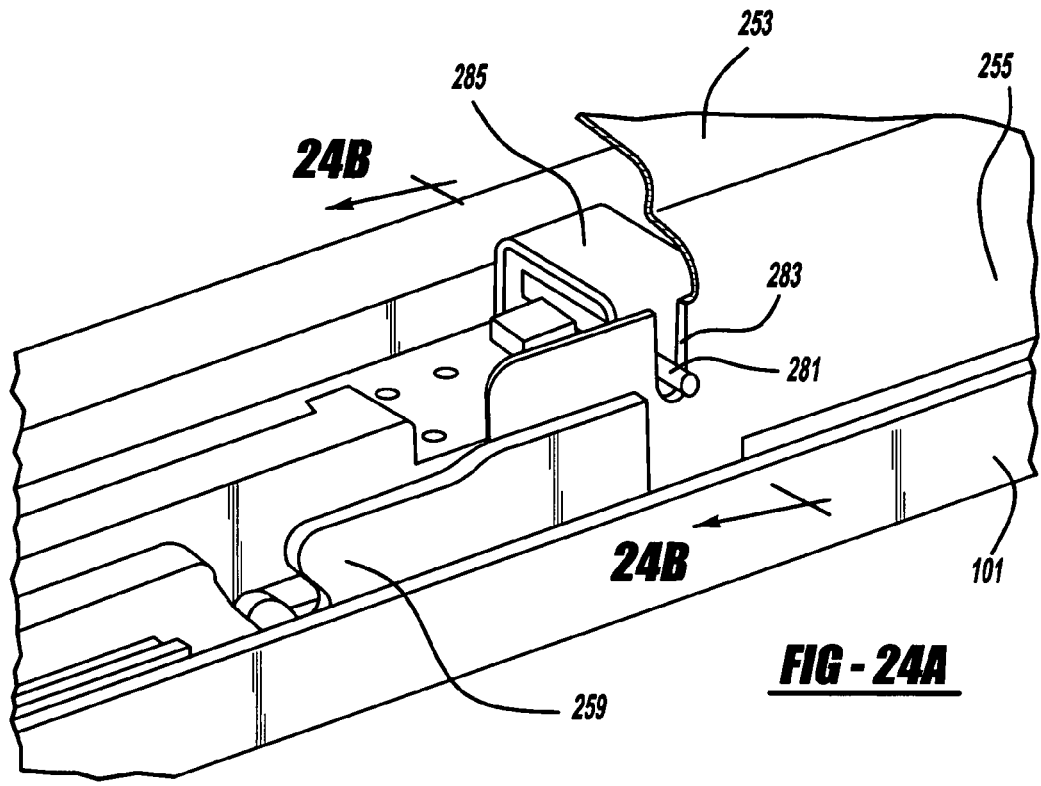
FIG. 24A is a fragmentary perspective view showing a central movement mechanism of the sunroof system, disposed in a closed position.
Figure 24B:
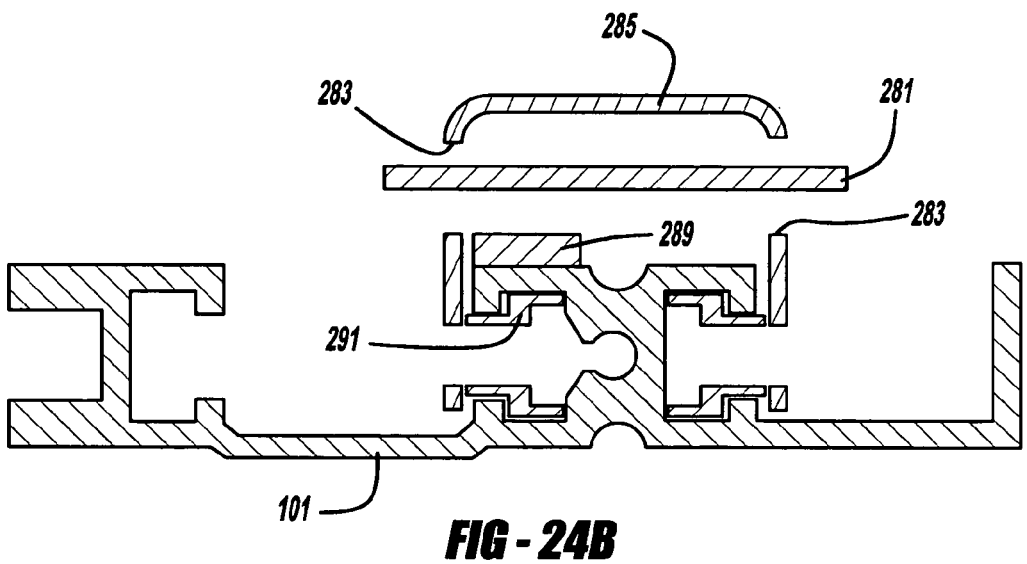
FIG. 24B is a cross sectional view, taken along line 24B-24B of FIG. 24A, showing the central movement mechanism of the sunroof system.
Figure 26:
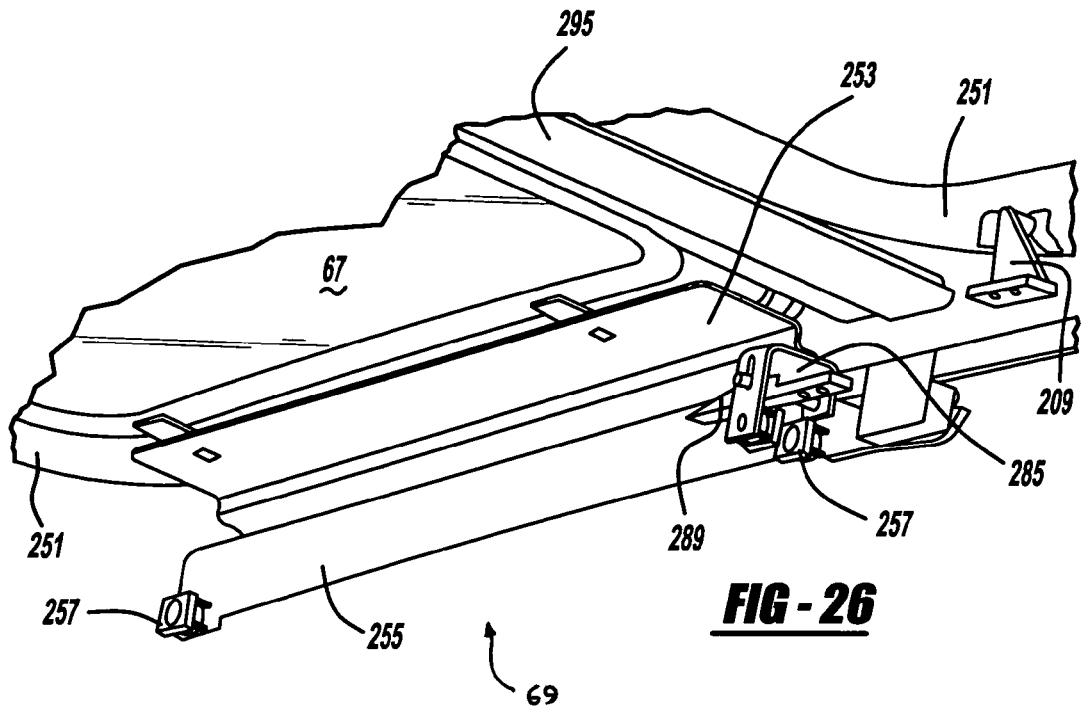
FIG. 26 is a perspective view, taken from a front right vehicular corner, showing the central movement mechanism of the sunroof assembly, disposed in a closed position.
Figure 27:
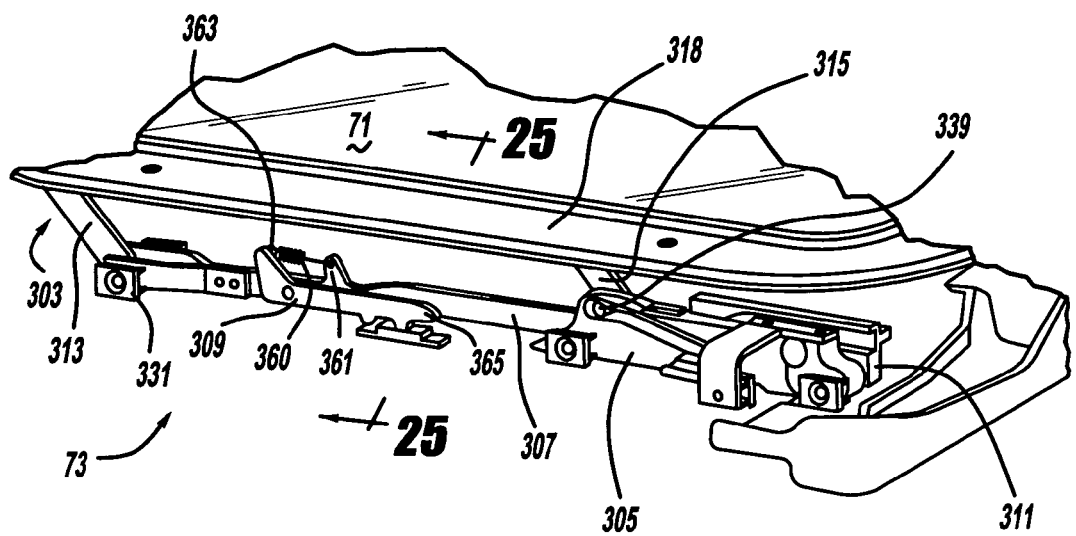
FIG. 27 is a perspective view, taken from a rear left vehicular corner, showing a left-hand rear movement mechanism of the sunroof system, disposed in its closed position.
Figure 28A:
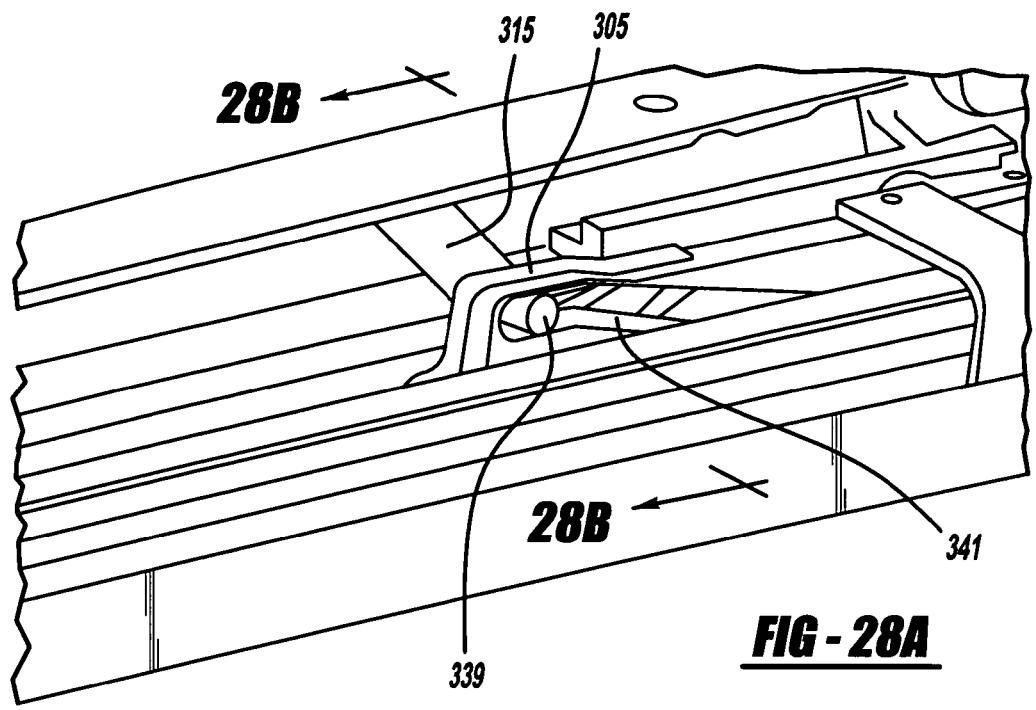
FIG. 28A is a perspective view, taken from a front left vehicular corner, showing the rear movement mechanism of the sunroof system, disposed in its closed position.
Figure 28B:
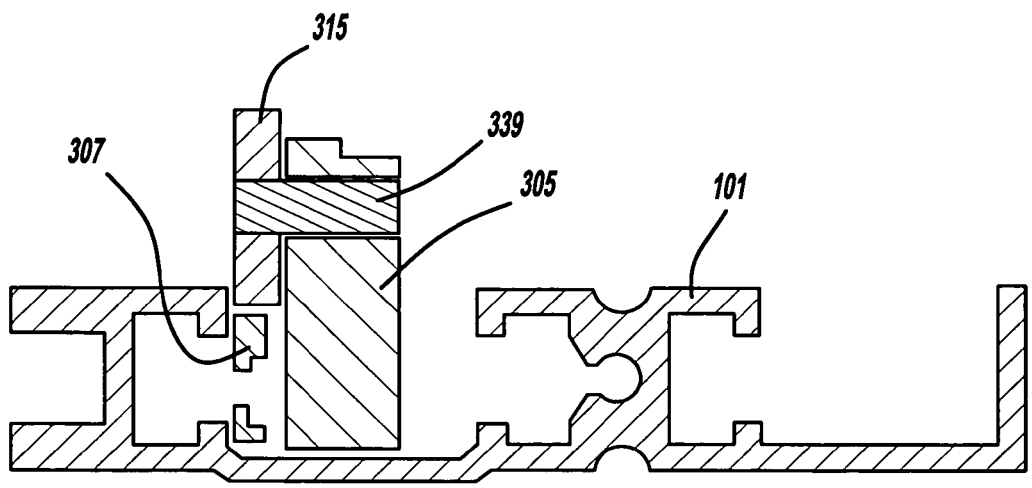
FIG. 28B is a cross sectional view, taken along line 28B-28B of FIG. 28A, showing the rear movement mechanism of the sunroof system.
Figure 29A:
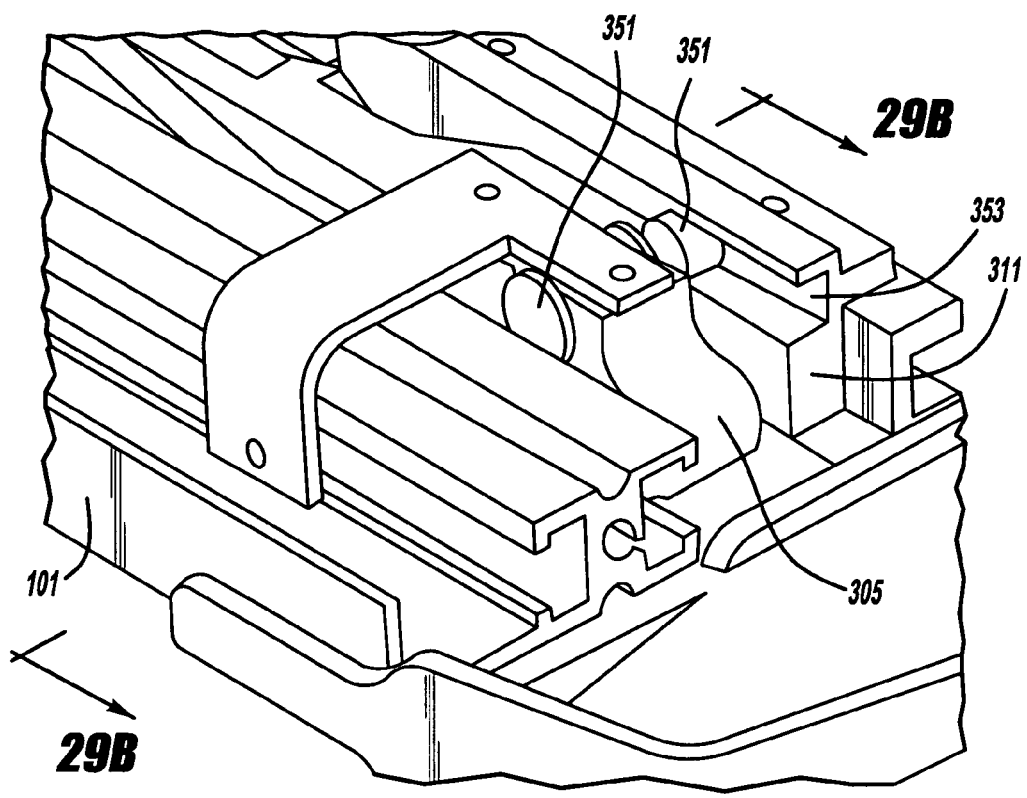
FIG. 29A is a perspective view, taken from a rear left vehicular corner, showing the rear movement mechanism of the sunroof system, disposed in a closed position.
Figure 29B:
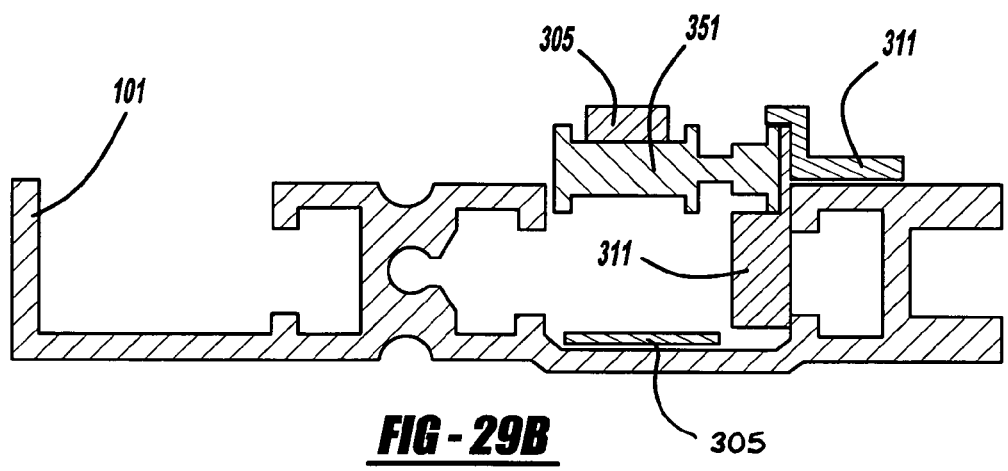
FIG. 29B is cross sectional view, taken along line 29B-29B of FIG. 29A, showing the rear movement mechanism of the sunroof system.
Figure 30:
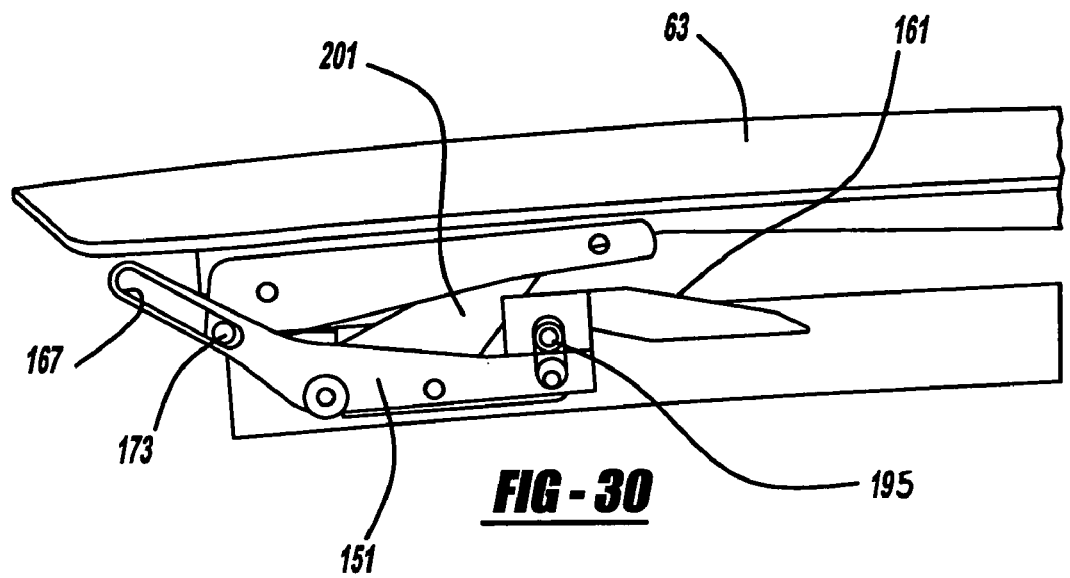
Figure 31:
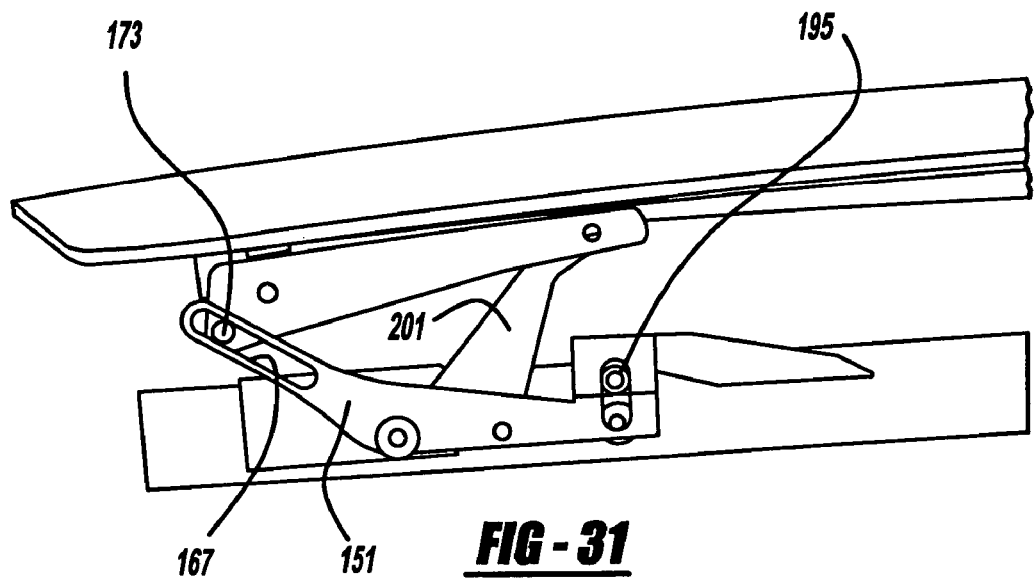
Figure 32:
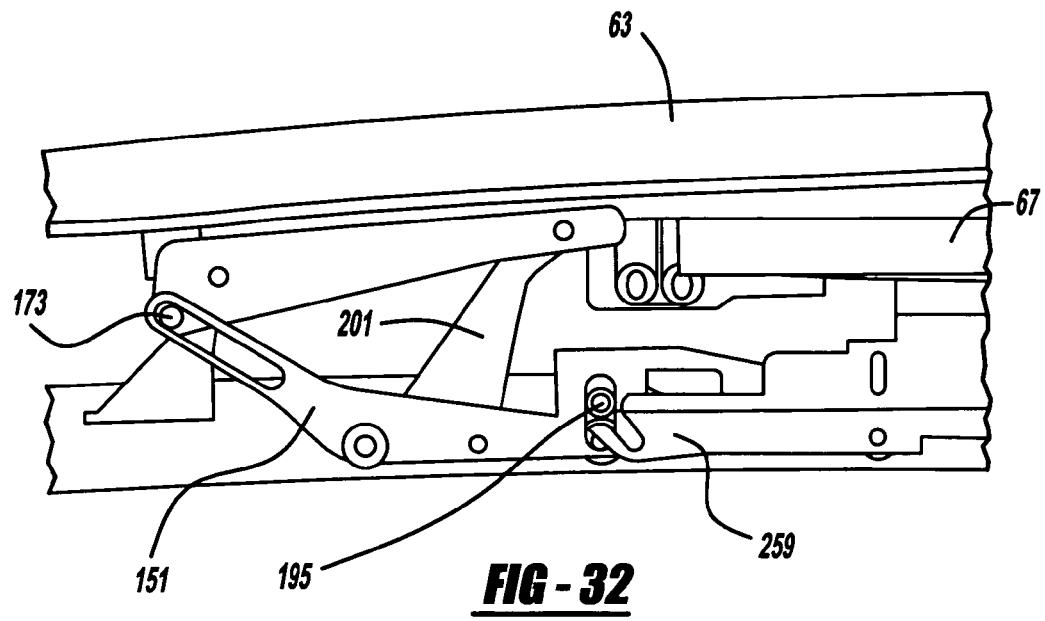
Figure 33:
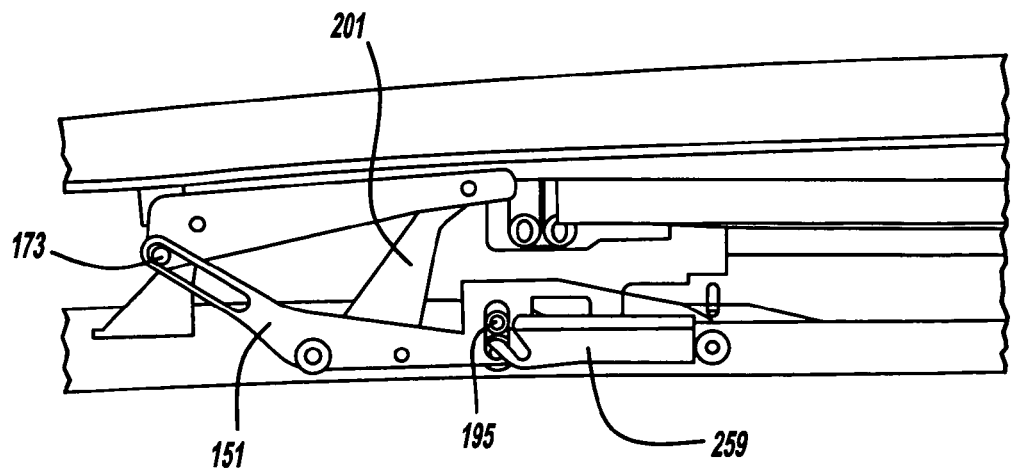
Figure 34:
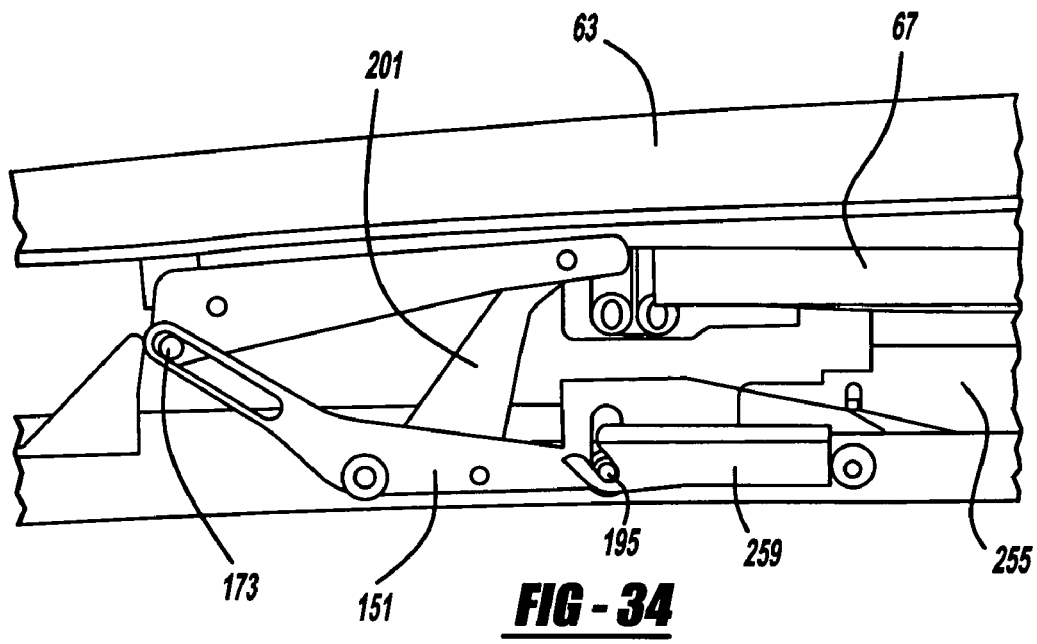
Figure 35:
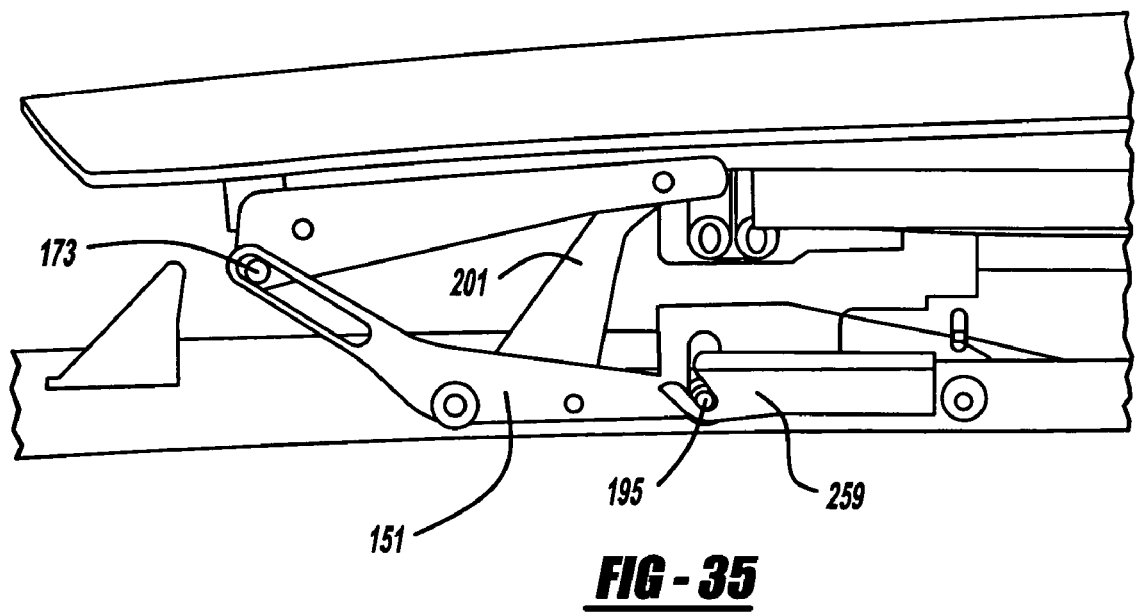

Front movement mechanism 65 further employs a lift arm link 201 that is pivotally attached to the body of front slide block 151 and is pivotally attached to front bracket 175, by fixed axis pivots 203 and 205, respectively. A guide pin 207 (see FIG. 22) couples lift arm link 201 to camming slot 141 of front track insert 139. Supplemental panel locks 209 are stationarily attached to track 101 and have a lateral pin which selectively engages a receptacle of secondary bracket 176 when front sunroof panel 63 is in its closed position. The operation of front movement mechanism can be observed in FIGS. 30-35 where FIG. 30 represents the closed position, FIG. 31 represents the venting position, and FIG. 34 represents front and central mechanism engagement.

Central movement mechanism 69 is illustrated in FIGS. 18, 19, 24A, 24B and 26. Central sunroof panel 67 has a peripheral frame 251 adhered to a bottom surface thereof, with a generally L-shaped bracket 253 having a generally vertical and fore-and-aft elongated wall 255 extending down therefrom. Rollers or slide feet 257 laterally project from wall 255 for engagement within third guide channel 113 (see FIG. 12) of track 101. A bifurcated hook 259 forwardly projects from wall 255 and has a diagonally open receptacle 261 selectively aligned with diagonal camming slot section 137 of cam insert 131. When the front sunroof panel and front movement mechanism 65 have been partially rearwardly moved to the position shown in FIG. 34, then pin 195 is downwardly moved within slot 193 by diagonal camming slot 137 in order to engage within receptacle 261 of hook 259. This rearward movement of front movement mechanism 65 further causes ramp 161 to upwardly drive locking pin 281 within a pair of generally vertical slots 283. Slots 283 are located in a generally inverted-U shaped housing 285 affixed to an inside surface of bracket 253. This causes the crosscar elongated locking pin 281 to rise over an abutment surface 287 of a stop 289 which is stationarily attached to track 101. In its closed position, central sunroof 67 is positionally secured by abutment of pin 281 against abutment surface 287. An extension spring downwardly biases pin 281. Furthermore, a slide or roller foot 291 slidably rides within the second guide channel of track 101. Thus, disengagement of locking pin 281 from stop 289 and engagement of pin 195 with hook 259 allows central movement mechanism 69 and central sunroof panel 67 to be passively driven fore-and-aft by front movement mechanism 65 and front sunroof panel 63, for example, from the position shown in FIG. 34 to that shown in FIG. 35. Moreover, a double bulb weatherstrip 293 is mounted in a crosscar extending drain trough 295 in order to seal against the bottom of frame 251 of front sunroof panel 63.

Rear sunroof panel 71 and its associated movement mechanism 73 are independently driven by a rear electric motor actuator 301 (see FIG. 2) via a Bowden-type cable. Rear movement mechanism 73 can best be observed in FIGS. 22, 23 and 25-29B. Rear movement mechanism 73 includes a four-bar linkage assembly 303, a rear slide block 305 and a rear panel carriage 307. These act in concert with a rear panel carriage lock 309 and a rear track insert 311. Four-bar linkage assembly 303 has a generally straight leading link 313 and a generally straight trailing link 315. An upper end of each link 313 and 315 is pivotally attached to a bracket 317, which is attached to an underside of a frame 318 peripherally adhered to rear sunroof panel 71, by fixed axis pivots 319. A lower end of leading link 313 is pivotally connected to rear panel carriage 307, adjacent laterally extending rollers or slide feet 331, about a fixed axis pivot. A lower end of trailing link 315 has a fixed axis pivot 335 connected to a hook 337 rearwardly projecting from rear panel carriage 307. Trailing link 315 further includes a cam follower pin 339 laterally projecting from a middle portion thereof. Cam follower pin 339 rides along an angled camming path 341 in rear slide block 305.

Figure 36:
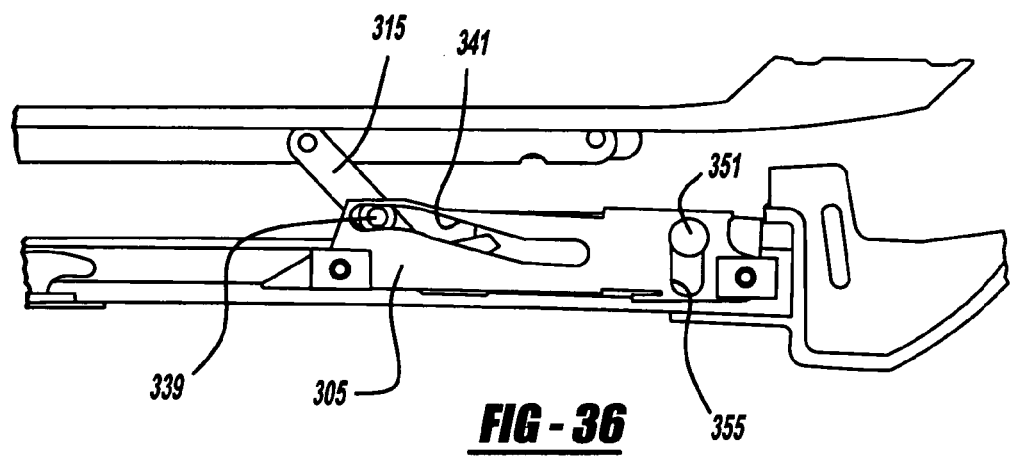
Figure 37:
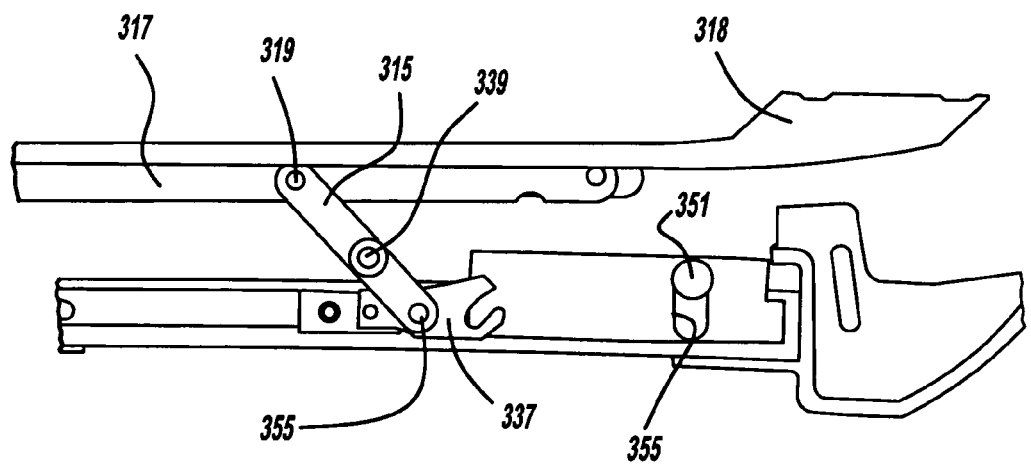

A rear panel locking pin 351 extends in a crosscar direction with a proximal end acting as a cam follower riding in a camming groove 353 in rear track insert 311. Camming groove 353 has a generally fore-and-aft and horizontally elongated rear section and a front diagonal section that is forwardly declining. An opposite distal end of rear panel locking pin 351 rides within a generally vertical slot 355 (see FIG. 36) of rear slide block 305. A rearwardly open receptacle 357 of hook 337 is selectively aligned with the diagonal section of camming groove 353 of rear track insert 311 to receive an intermediate section of rear panel locking pin 351, whereafter the hook and rear panel carriage lock 309 are secured and locked in a closed position.

Figure 38:
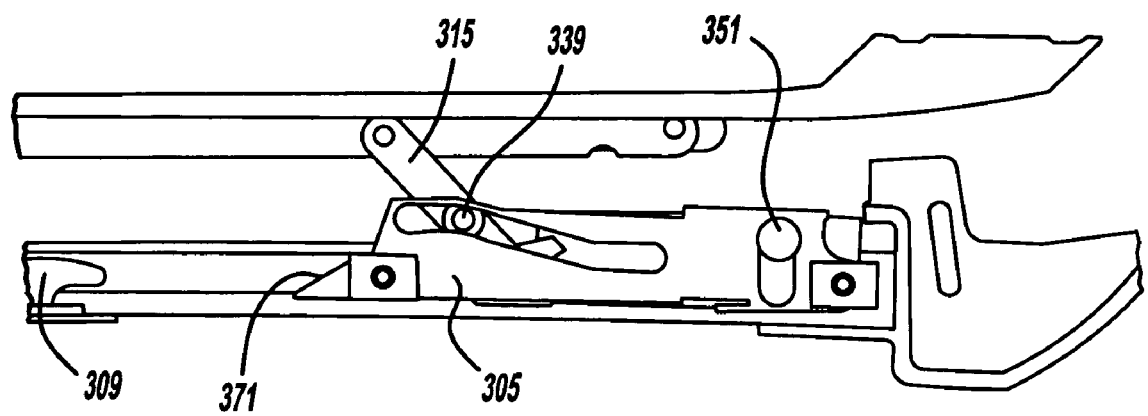
Figure 41:
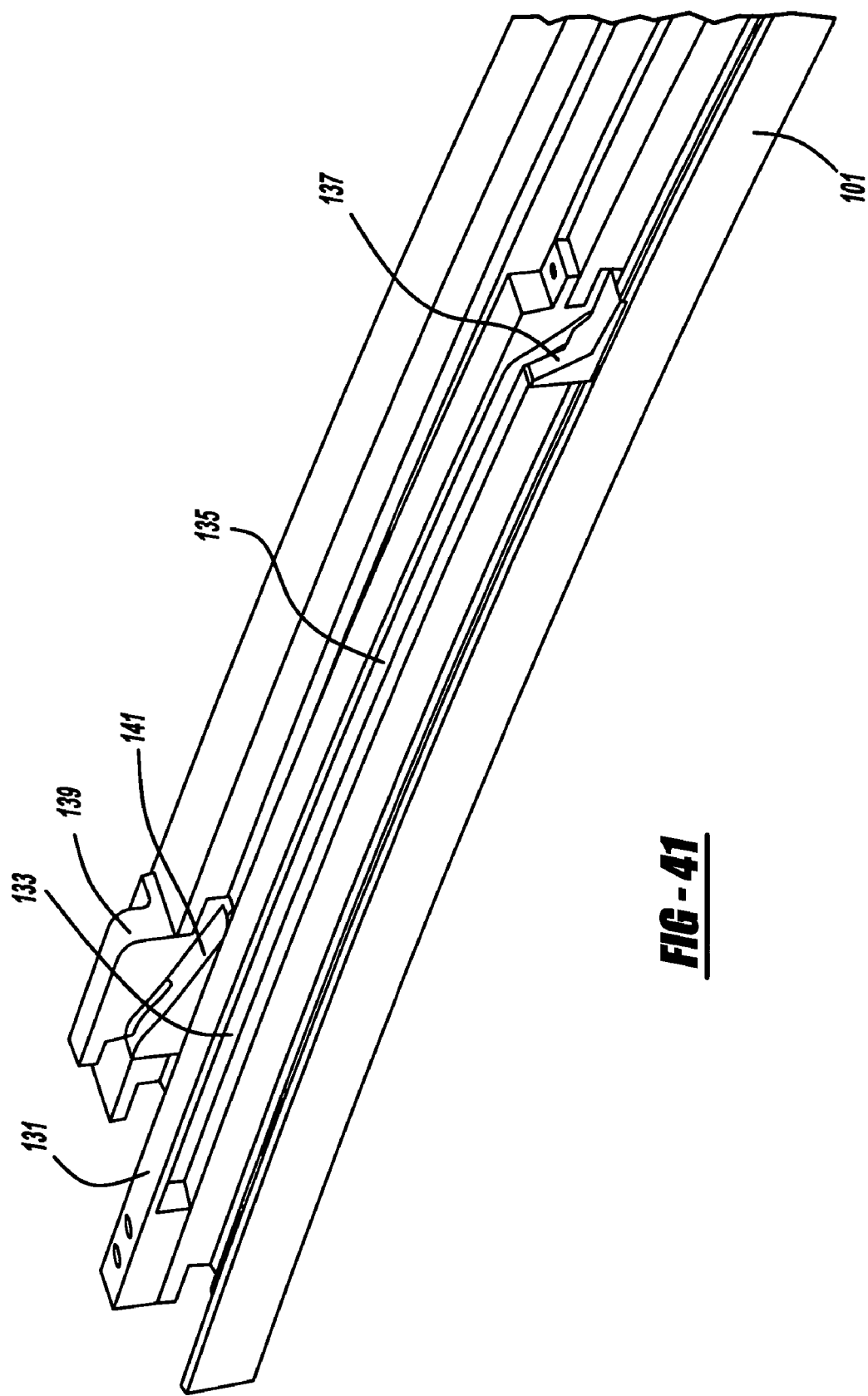
FIG. 41 is a perspective view, taken from the rear left vehicular corner, showing track inserts associated with the front movement mechanism of the sunroof system.

An extension spring 360 runs from a hole 361 in rear panel carriage lock 309 to a post 363 from rear panel carriage lock 309 in order to bias the carriage lock down into a receiver 365 stationarily secured to track 101. A ramp 371, shown in FIGS. 38 and 39, forwardly projecting from rear slide block 305 operably contacts against and upwardly disengages a trailing end of rear panel carriage lock 309 from stationary lock receiver 365 to allow for continued forward movement of rear sunroof panel 71. The movement of rear sunroof panel 71 and its associated rear movement mechanism 73 can be observed with reference to FIGS. 36-40. In its closed position, the four-bar linkage assembly is upwardly extended and both locking devices are in a locking orientation. However, forward movement of rear slide block 305 causes four-bar linkage assembly 303 to collapse and further forward movement causes unlocking of the locking devices 351 and 309. Thereafter, rear sunroof panel 71 is moved to its open position beneath central sunroof panel 67.

While the multi-panel sunroof has been disclosed, it should be appreciated that other variations fall within the scope of the present invention. For example, two or more central sunroof panels and their associated movement mechanisms may be provided. Furthermore, a central sunroof panel may be actively driven by its own actuator although some of the advantages of the present invention may not be realized. Additionally, it is envisioned that alternate camming, linkages, or track configurations can be employed although various packaging advantages may not be achieved. Alternately, the central sunroof panel can be stationary and immovably affixed to the tracks with brackets, but with the common tracks still being employed. In another alternate embodiment, the rear header panel moves with the rear sunroof panel. It is further envisioned that some of the mechanisms disclosed herein can be used with a single panel sunroof although many of the advantages of the present invention will not be observed. The present invention can also be part of a modularized and preassembled unit including a roof rack, headliner, sun visor assist handles and overhead entertainment console, with a single electrical connection. It is intended by the following claims to cover these and any other departures from the disclosed embodiments which fall within the true spirit of this invention.

The invention claimed is:

1. A sunroof system comprising:
a front sunroof panel having a rigid and substantially horizontally planar exterior surface, when viewed in a closed position;
a central sunroof panel having a rigid and substantially horizontally planar exterior surface, when viewed in a closed position;
at least a rear sunroof panel having a rigid and substantially horizontally planar exterior surface, when viewed in a closed position;
a front movement mechanism coupled to the front sunroof panel, the front movement mechanism allowing the front panel to be moved from a closed position to an open position, the open position being substantially rear of the closed position;
a central movement mechanism coupled to the central sunroof panel, the central movement mechanism allowing the central panel to be moved from a closed position to an open position;
a rear movement mechanism coupled to the rear sunroof panel, the rear movement mechanism allowing the rear panel to be moved from a closed position to an open position, the open position being substantially forward of the closed position; and
an automatically powered actuator operably driving the rear movement mechanism;
the front and rear sunroof panels being movable to their open positions in a stacked relationship relative to the central sunroof panel;
wherein at least one of the movement mechanisms comprises:
(a) a cable-driven slide block including a diagonally upstanding camming slot;
(b) a bracket affixed to and downwardly extending from the respective sunroof panel, a cam follower protecting from the bracket and riding along the camming slot; and
(c) an elongated lift arm being pivotally coupled to the slide block and the respective sunroof panel.

2. The sunroof system of claim 1 wherein the slide block further comprises:
a rearwardly declining ramp;
a substantially inverted-U shaped housing located between the ramp and the camming slot, the housing including a substantially vertically elongated aperture; and
a first movable pin operably sliding within the aperture of the housing.

3. The sunroof system of claim 2 wherein the central sunroof mechanism comprises:
a first receiver operably engaging the first pin;
a central bracket coupled to and movable with the central sunroof panel; and
a second pin movably coupled to the central bracket, the ramp operably moving the second pin.

4. The sunroof system of claim 1 wherein the rear movement mechanism comprises:
a cable-driven slide block;
a four-bar linkage assembly operably raising and lowering the rear sunroof panel; and
at least one cam follower affixed to the four-bar linkage assembly moving in a fore-and-aft camming manner along a camming path of the slide block.

5. The sunroof system of claim 1 further comprising:
a first electric motor operably driving the front sunroof panel;
wherein the powered actuator is a second electric motor operably driving the rear sunroof panel; and
wherein the central sunroof panel is passively driven by the front sunroof panel.

6. The sunroof system of claim 1 wherein:
the front sunroof panel is glass and movable to its open position above the central sunroof panel; and
the rear sunroof panel is glass and movable to its open position below the central sunroof panel.

7. The sunroof system of claim 1 wherein:
the front and central sunroof panels are located in an intermediate position when the front sunroof panel is in its open position and the central sunroof panel is in its closed position; and
the front and central sunroof panels are movable to a rearmost location stacked relative to the rear sunroof panel when the rear sunroof panel is in its closed position, the central sunroof panel is in its open position and the front sunroof panel is in an extended open position.

8. The sunroof system of claim 1 wherein the rear sunroof panel is movable in a forward direction from its closed position to its open position without requiring movement of the front and central sunroof panels from their closed positions.

9. A sunroof system comprising:
a first sunroof assembly including a first sunroof panel and a first movement mechanism;
a second sunroof assembly including a second sunroof panel and a second movement mechanism; and
at least a third sunroof assembly including a third sunroof panel and a third movement mechanism;
each of the sunroof panels being movable from a closed position to an open position by their respective movement mechanisms;
at least two of the sunroof panels being movable without requiring movement of the other of the sunroof panels; and
the three sunroof panels being in a stacked relationship relative to each other when in a first set of the positions and in a second set of the positions, the second set of positions located rearward of the first set of positions; wherein the first movement mechanism comprises:
  (a) a cable-driven slide block including a diagonally upstanding camming slot;
  (b) a bracket affixed to and downwardly extending from the first sunroof panel, a cam follower protecting from the bracket and riding along the camming slot; and
  (c) an elongated lift arm being pivotally coupled to the slide block and the first sunroof panel.

10. The sunroof system of claim 9 wherein the slide block of the first movement mechanism further comprises:
  a rearwardly declining ramp;
  a substantially inverted-U shaped housing located between the ramp and the camming slot, the housing including a substantially vertically elongated aperture; and
  a movable pin operably sliding within the aperture of the housing.

11. The sunroof system of claim 10 wherein the second sunroof mechanism comprises:
  a first receiver operably engaging the pin of the first movement mechanism;
  a bracket coupled to and movable with the second sunroof panel; and
  a second pin movably coupled to the bracket, the ramp from the first movement mechanism operably moving the second pin.

12. The sunroof system of claim 9 wherein the third movement mechanism comprises:
  a cable-driven slide block;
  a four-bar linkage assembly operably raising and lowering the third sunroof panel; and
  at least one cam follower affixed to the four-bar linkage assembly moving in a fore-and-aft camming manner along a camming path of the slide block.

13. The sunroof system of claim 9 further comprising:
  a first electric motor operably driving the third sunroof panel;
  wherein the powered actuator is a second electric motor operably driving the first sunroof panel; and
  wherein one of the sunroof panels is passively driven by one of the other sunroof panels.

14. The sunroof system of claim 9 wherein:
  the first sunroof panel is a front roof panel;
  the second roof panel is a central roof panel;
  the front sunroof panel is glass and is movable to its position above the central sunroof panel; and
  the rear sunroof panel is glass and movable to its open position below the central sunroof panel.

15. The sunroof system of claim 9 wherein:
  the first and second sunroof panels are movable to a central position when the first sunroof panel is in its open position and the second sunroof panel is in its closed position; and
  the first and second sunroof panels are movable to a rearmost location stacked relative to the third sunroof panel when the third sunroof panel is in its closed position, the second sunroof panel is in its open position and the first sunroof panel is in an extended open position.

16. The sunroof system of claim 9 wherein the third sunroof panel is movable in a forward direction from its closed position to its open position without requiring movement of the first and second sunroof panels from their closed positions.

17. A method of operating an automotive vehicle sunroof, the sunroof including a front sunroof panel, a central exterior roof panel and a rear sunroof panel, the method comprising:
  (a) automatically moving the front sunroof panel from a closed position to an open position, the open position being rearward of the closed position, and the front panel being in a stacked relationship to the central panel when the front panel is in its open position;
  (b) moving the rear sunroof panel from a closed position to an open position, the open position being forward of the closed position, and the rear panel being in a stacked relationship to the central panel when the rear panel is in its open position;
  (c) passively driving the central panel based on movement of at least one of the other sunroof panels;
  (d) moving a cable to cause movement of at least one of the sunroof panels; and
  (e) moving a cam follower alone a camming slot in response to step (d).

18. The method of claim 17 further comprising stacking the front sunroof panel above the central panel and the rear sunroof panel below the central panel when the front and rear panels are in their open positions.

19. The method of claim 18 wherein the central panel is a sunroof panel selectively moving from a first position to a second position.

20. The method of claim 17 further comprising stacking the three panels relative to each other when the front sunroof panel is in an extended open position, the central panel is in an openly moved position and the rear sunroof panel is in its closed position.

21. The method of claim 17 further comprising tilting the front sunroof panel from the closed position to a venting position.

22. The method of claim 17 further comprising locating a majority of the front sunroof panel directly above a majority of the central panel and locating a majority of the rear sunroof panel directly below a majority of the central panel when the front and rear sunroof panels are in their open positions.

23. The method of claim 17 wherein at least a majority of the front, central and rear panels are transparent.

24. The method of claim 17 further comprising sliding a first cam follower along a first cam and rotating first links on at least one side to move the rear sunroof panel, and sliding a second cam follower along a second cam and rotating a second link to move the front sunroof panel.

* * * * *

UNITED STATES PATENT AND TRADEMARK OFFICE
CERTIFICATE OF CORRECTION

PATENT NO. : 7,314,246 B2
APPLICATION NO. : 11/316382
DATED : January 1, 2008
INVENTOR(S) : Arthur L. MacNee, III and Christopher J. Dilluvio It is certified that error appears in the above-identified patent and that said Letters Patent is hereby corrected as shown below:

Column 7, line 63-64, Claim 1, "protecting" should be --projecting--.

Column 9, line 7, Claim 9, "protecting" should be --projecting--.

Column 10, line 27, Claim 17, "alone" should be --along--.

Signed and Sealed this

Ninth Day of December, 2008

JON W. DUDAS
*Director of the United States Patent and Trademark Office*